US009560448B2

(12) United States Patent
Hartung

(10) Patent No.: US 9,560,448 B2
(45) Date of Patent: Jan. 31, 2017

(54) SYSTEM AND METHOD FOR DIRECTIONALLY RADIATING SOUND

(75) Inventor: Klaus Hartung, Hopkinton, MA (US)

(73) Assignee: Bose Corporation, Framingham, MA (US)

( * ) Notice: Subject to any disclaimer, the term of this patent is extended or adjusted under 35 U.S.C. 154(b) by 939 days.

(21) Appl. No.: 11/780,468

(22) Filed: Jul. 19, 2007

(65) Prior Publication Data

US 2008/0273714 A1 Nov. 6, 2008

Related U.S. Application Data

(63) Continuation-in-part of application No. 11/744,597, filed on May 4, 2007.

(51) Int. Cl.
*H04B 1/00* (2006.01)
*H04R 1/02* (2006.01)
(Continued)

(52) U.S. Cl.
CPC ................. *H04R 5/02* (2013.01); *H04S 7/302* (2013.01); *H04R 5/023* (2013.01);
(Continued)

(58) Field of Classification Search
CPC ............ H04R 2430/20; H04R 2430/25; H04R 2203/12; H04R 1/323; H04R 1/403; H04R 5/02; H04R 5/023; H04R 2499/13; H04S 3/002; H04S 7/302; H04S 2400/11; H04S 2420/03
(Continued)

(56) References Cited

U.S. PATENT DOCUMENTS 3,976,162 A 8/1976 Cummings
4,569,074 A 2/1986 Polk
(Continued)

FOREIGN PATENT DOCUMENTS

EP 0637191 2/1995
EP 1194007 4/2002
(Continued)

OTHER PUBLICATIONS

Elliot, S.J. "Signal Processing for Active Control," Academic Press, 2001. pp. 151-200.
(Continued)

*Primary Examiner* — Vivian Chin
*Assistant Examiner* — Douglas Suthers
(74) *Attorney, Agent, or Firm* — Nelson Mullins Riley & Scarborough, LLP

(57) ABSTRACT

An audio system for a vehicle has at least one source of audio signals. A respective directional loudspeaker array is mounted at each seat position and coupled to the at least one source. The at least one source includes a microphone that detects speech from an occupant of the first seat position. Processing circuitry receives signals from the microphone that correspond to the detect speech and drives each second respective loudspeaker array at the other seat positions to radiate acoustic energy corresponding to the detected speech. The processing circuitry processes magnitude and phase of the signals from the microphone to each second directional loudspeaker array so that each second directional loudspeaker array directionally radiates first acoustic energy to the seat position at which the second directional loudspeaker array is located and so that second acoustic energy radiated from the second directional array to the first seat position is less than the first acoustic energy according to a predetermined criteria.

9 Claims, 15 Drawing Sheets

(51) Int. Cl.
*H04R 3/00* (2006.01)
*H04R 5/02* (2006.01)
*H04S 7/00* (2006.01)
*H04S 3/00* (2006.01)

(52) U.S. Cl.
CPC .......... *H04R 2499/13* (2013.01); *H04S 3/002* (2013.01); *H04S 2400/11* (2013.01); *H04S 2420/03* (2013.01)

(58) Field of Classification Search
USPC ................ 381/86, 89, 392, 304, 307, 95, 96
See application file for complete search history.

(56) References Cited

U.S. PATENT DOCUMENTS

| | | | |
|---|---|---|---|
| 4,641,345 | A | 2/1987 | Takahashi |
| 4,653,606 | A | 3/1987 | Flanagan |
| 4,944,018 | A | 7/1990 | Bose et al. |
| 5,031,220 | A | 7/1991 | Takagi et al. |
| 5,034,984 | A | 7/1991 | Bose |
| 5,046,097 | A | 9/1991 | Lowe et al. |
| 5,131,051 | A | 7/1992 | Kishinaga et al. |
| 5,208,866 | A | 5/1993 | Kato et al. |
| 5,228,085 | A | 7/1993 | Aylward |
| 5,434,922 | A | 7/1995 | Miller et al. |
| 5,459,790 | A | 10/1995 | Scofield et al. |
| 5,666,426 | A | 9/1997 | Helms |
| 5,754,664 | A | 5/1998 | Clark et al. |
| 5,764,777 | A | 6/1998 | Goldfarb |
| 5,809,153 | A | 9/1998 | Aylward et al. |
| 5,815,580 | A | 9/1998 | Craven et al. |
| 5,870,484 | A | 2/1999 | Greenberger |
| 5,889,875 | A | 3/1999 | Caron et al. |
| 5,946,401 | A | 8/1999 | Ferren |
| 5,949,894 | A | 9/1999 | Nelson et al. |
| 5,953,432 | A | 9/1999 | Yanagawa et al. |
| 5,995,631 | A | 11/1999 | Kamada et al. |
| 6,067,360 | A | 5/2000 | Kasai et al. |
| 6,154,545 | A | 11/2000 | Kohut et al. |
| 6,535,609 | B1 | 3/2003 | Finn et al. |
| 6,674,865 | B1 * | 1/2004 | Venkatesh et al. ........... 381/107 |
| 6,853,732 | B2 | 2/2005 | Scofield |
| 7,092,531 | B2 | 8/2006 | Enya et al. |
| 7,164,768 | B2 | 1/2007 | Aylward et al. |
| 7,483,540 | B2 | 1/2009 | Rabinowitz et al. |
| 7,508,952 | B2 | 3/2009 | Hofmann et al. |
| 7,519,188 | B2 | 4/2009 | Berardi et al. |
| 7,545,946 | B2 | 6/2009 | Melanson |
| 7,561,706 | B2 | 7/2009 | Holmi et al. |
| 7,688,992 | B2 | 3/2010 | Aylward et al. |
| 8,045,743 | B2 | 10/2011 | Aylward et al. |
| 8,175,317 | B2 | 5/2012 | Nakano |
| 8,199,940 | B2 | 6/2012 | Yokota |
| 8,483,413 | B2 | 7/2013 | Hartung et al. |
| 8,724,827 | B2 | 5/2014 | Hartung et al. |
| 2002/0150254 | A1 | 10/2002 | Wilcock et al. |
| 2003/0103636 | A1 | 6/2003 | Arai et al. |
| 2003/0179891 | A1 | 9/2003 | Rabinowitz et al. |
| 2004/0105550 | A1 | 6/2004 | Aylward et al. |
| 2004/0105559 | A1 | 6/2004 | Aylward et al. |
| 2004/0196982 | A1 * | 10/2004 | Aylward et al. ................ 381/17 |
| 2005/0063555 | A1 | 3/2005 | Berardi et al. |
| 2005/0128106 | A1 | 6/2005 | Nakaishi et al. |
| 2005/0152562 | A1 | 7/2005 | Holmi et al. |
| 2005/0270146 | A1 | 12/2005 | Enya et al. |
| 2006/0262935 | A1 | 11/2006 | Goose et al. |
| 2006/0262938 | A1 | 11/2006 | Gauger, Jr. et al. |
| 2007/0058824 | A1 | 3/2007 | Aylward et al. |
| 2007/0092100 | A1 | 4/2007 | Holmi et al. |
| 2007/0098205 | A1 | 5/2007 | Holmi et al. |
| 2007/0116298 | A1 | 5/2007 | Holmi et al. |
| 2007/0183617 | A1 | 8/2007 | Yokota et al. |
| 2007/0280486 | A1 * | 12/2007 | Buck et al. ..................... 381/92 |
| 2008/0031472 | A1 | 2/2008 | Freeman et al. |
| 2008/0037794 | A1 | 2/2008 | Sugawara et al. |
| 2008/0273713 | A1 | 11/2008 | Hartung et al. |
| 2008/0273722 | A1 | 11/2008 | Aylward et al. |
| 2008/0273723 | A1 | 11/2008 | Hartung et al. |
| 2008/0273724 | A1 | 11/2008 | Hartung et al. |
| 2008/0273725 | A1 | 11/2008 | Hartung et al. |

FOREIGN PATENT DOCUMENTS

| | | | |
|---|---|---|---|
| EP | 1272004 | | 1/2003 |
| EP | 1370115 | | 12/2003 |
| EP | 1389892 | | 2/2004 |
| EP | 1427253 | A2 | 6/2004 |
| EP | 1427254 | | 6/2004 |
| EP | 1763281 | A2 | 3/2007 |
| EP | 1788838 | | 5/2007 |
| FR | 2768099 | A1 | 3/1999 |
| GB | 2264613 | | 9/1993 |
| GB | 2338621 | | 12/1999 |
| JP | 61-127299 | | 6/1986 |
| JP | 64-078600 | | 3/1989 |
| JP | 02-007699 | | 1/1990 |
| JP | 03-085095 | | 4/1991 |
| JP | 03-085096 | | 4/1991 |
| JP | H04-321449 | | 11/1992 |
| JP | H05-061487 | | 3/1993 |
| JP | H05-122799 | | 5/1993 |
| JP | 05-191342 | | 7/1993 |
| JP | H05-344584 | | 12/1993 |
| JP | 07-264689 | | 10/1995 |
| JP | 09-070100 | | 3/1997 |
| JP | H09-171387 | | 6/1997 |
| JP | H09-247784 | | 9/1997 |
| JP | 2003111200 | | 4/2003 |
| JP | 2006345480 | | 12/2006 |
| JP | 2007124129 | | 5/2007 |
| JP | 2008270857 | | 11/2008 |
| WO | 97/16048 | | 5/1997 |
| WO | 00/19415 | | 4/2000 |
| WO | 00/52959 | | 9/2000 |
| WO | 02/065815 | | 8/2002 |
| WO | WO 02098171 | | 12/2002 |
| WO | WO 2004/049755 | A1 | 6/2004 |

OTHER PUBLICATIONS

PCT search report and written opinion for PCT/US2008/060190, corresponding to U.S. Appl. No. 11/744,579, dated Jul. 30, 2008.
PCT search report and written opinion for PCT/US2008/059994, corresponding to U.S. Appl. No. 11/744,597, dated Sep. 29, 2008.
PCT search report and written opinion for PCT/US2008/070680, corresponding to U.S. Appl. No. 11/780,463, dated Feb. 11, 2009.
PCT search report and written opinion for PCT/US2008/070675, corresponding to U.S. Appl. No. 11/780,461, dated Oct. 21, 2008.
PCT search report and written opinion for PCT/US2008/070678, corresponding to U.S. Appl. No. 11/780,464, dated Jan. 12, 2009.
PCT search report and written opinion for PCT/US2008/070673, corresponding to U.S. Appl. No. 11/780,466, dated Oct. 21, 2008.
PCT search report and written opinion for corresponding application No. PCT/US2008/070672, dated Feb. 6, 2009.
Office Action dated Mar. 30, 2011, for corresponding U.S. Appl. No. 11/780,463.
Office Action dated Mar. 30, 2011, for corresponding U.S. Appl. No. 11/780,464.
Office Action dated Mar. 28, 2011, for corresponding U.S. Appl. No. 11/780,466.
Office Action dated Aug. 4, 2011, for U.S. Appl. No. 11/780,461.
Response to Office Action dated Mar. 30, 2011, for U.S. Appl. No. 11/780,463.
Response to Office Action dated Aug. 4, 2011, for U.S. Appl. No. 11/780,461.
Response to Office Action dated Mar. 30, 2011, for U.S. Appl. No. 11/780,464.
Response to Office Action dated Mar. 28, 2011, for U.S. Appl. No. 11/780,466.

(56) References Cited

OTHER PUBLICATIONS

Office Action dated Oct. 13, 2011, for U.S. Appl. No. 11/780,463.
Final Office Action dated Oct. 26, 2011, for U.S. Appl. No. 11/780,464.
Final Office Action dated Oct. 26, 2011, for U.S. Appl. No. 11/780,466.
Final Office Action dated Jan. 18, 2012, for U.S. Appl. No. 11/780,461.
Response to Office Action dated Oct. 13, 2011, for U.S. Appl. No. 11/780,463.
Chinese Office Action for application No. 200880018802.8, corresponding to U.S. Appl. No. 11/780,461, dated Jul. 19, 2007.
European Office Action for application No. 08796386.4, corresponding to U.S. published No. 2008/0273723, dated Aug. 23, 2010.
Response to Final Office Action dated Oct. 26, 2011, for U.S. Appl. No. 11/780,466.
Response to Final Office Action dated Oct. 26, 2011, for U.S. Appl. No. 11/780,464.
Response to Final Office Action dated Jan. 18, 2012, for U.S. Appl. No. 11/780,461.
Final Office Action dated Apr. 9, 2012, for U.S. Appl. No. 11/780,463.
Response to Final Office Action dated Apr. 9, 2012, for U.S. Appl. No. 11/780,463.
Office Action dated Jul. 5, 2012, for U.S. Appl. No. 11/780,461.
Response to Office Action dated Jul. 5, 2012, for U.S. Appl. No. 11/780,461.
Office Action dated Jun. 26, 2012, for U.S. Appl. No. 11/780,464.
Response to Office Action dated Jun. 26, 2012, for U.S. Appl. No. 11/780,464.
Chinese Office Action for application No. 200880018802.8, dated Jul. 2, 2012, corresponding to U.S. Appl. No. 11/780,461, filed Jul. 19, 2007.
Elliot, Stephen J., and Jones, Matthew, "An Active Headrest for Personal Audio," Journal of Acoustical Society of America, 119 (5), May 2006. Pp. 2702-2709
Japanese Office Notice of Reasons for Rejection for Japanese application No. 2010-517205, dated Jul. 23, 2013.
Office Action dated Aug. 8, 2013, for U.S. Appl. No. 11/780,466.
Response to Office Action dated Aug. 8, 2013, for U.S. Appl. No. 11/780,466.
Office Action dated Apr. 23, 2014, for U.S. Appl. No. 11/780,461.
Response to Office Action dated Apr. 23, 2014, for U.S. Appl. No. 11/780,461.
Final Office Action dated Sep. 11, 2015, for U.S. Appl. No. 11/780,461.
Response to Final Office Action dated Sep. 11, 2014, for U.S. Appl. No. 11/780,461.
Office Action dated Sep. 12, 2014, for U.S. Appl. No. 13/919,987.
Response to Office Action dated Sep. 12, 2014, for U.S. Appl. No. 13/919,987.

* cited by examiner

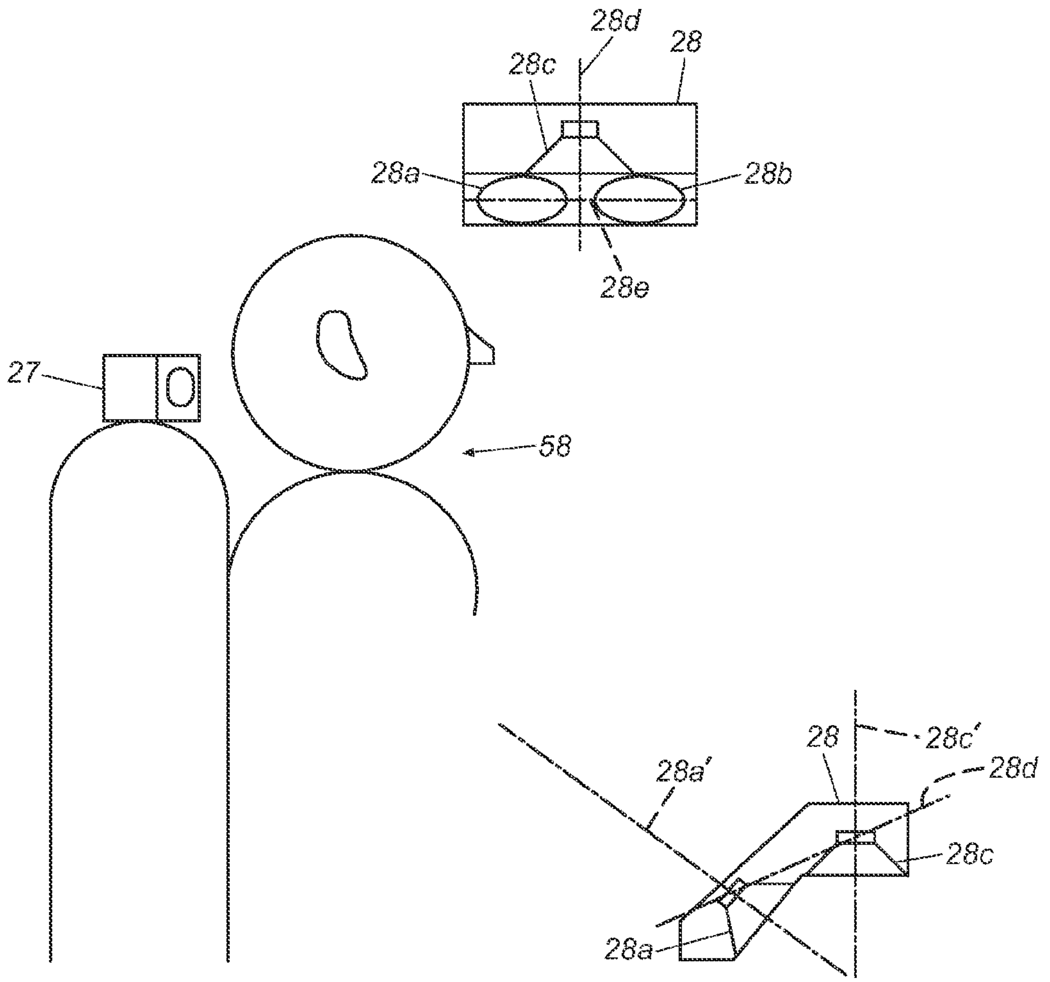
Fig. 2C
Fig. 2D
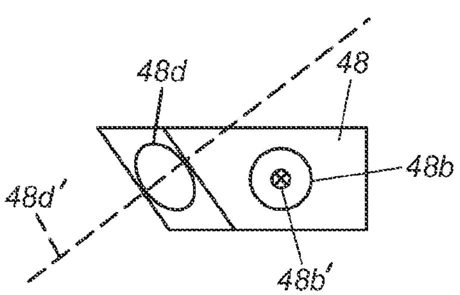
Fig. 2E

SYSTEM AND METHOD FOR DIRECTIONALLY RADIATING SOUND

The present application is a continuation-in-part of U.S. patent application Ser. No. 11/744,597 of Richard J. Aylward, Charles R. Barker III, James S. Garretson and Klaus Hartung, entitled DIRECTIONALLY RADIATING SOUND IN A VEHICLE and filed May 4, 2007, the entire disclosure of which is incorporated by reference herein.

BACKGROUND OF THE INVENTION

This specification describes an audio system, for example for a vehicle, that includes directional loudspeakers. Directional loudspeakers are described generally in U.S. Pat. Nos. 5,870,484 and 5,809,153. Directional loudspeakers in a vehicle are discussed in U.S. patent application Ser. No. 11/282,871, filed Nov. 18, 2005. The entire disclosures of U.S. Pat. Nos. 5,870,484 and 5,809,153, and of U.S. patent application Ser. No. 11/282,871, are incorporated by reference herein in their entireties.

SUMMARY OF THE INVENTION

In an embodiment of the present invention, an audio system for a vehicle having a plurality of seat positions includes at least one source of audio signals. A respective directional loudspeaker array is mounted at each seat position and is coupled to the at least one source so that the audio signals drive the respective loudspeaker array to radiate acoustic energy. The at least one source includes a microphone mounted in the vehicle with respect to each first seat position so that the microphone detects speech from an occupant of the first seat position and outputs signals corresponding to the detected speech. Processing circuitry is between the at least one source and each respective directional loud speaker array. The processing circuitry receives the signals from the microphone that correspond to speech detected at the first seat position and drives each second respective loudspeaker array at the other seat positions of the plurality of seat positions to radiate acoustic energy corresponding to the detected speech. The processing circuitry processes magnitude and phase of the signals from the microphone to each second directional loudspeaker array so that each second directional loudspeaker array directionally radiates first acoustic energy to the seat position at which the second directional loudspeaker array is located and so that second acoustic energy radiated from the second respective directional array to the first seat position is less than the first acoustic energy according to a predetermined criteria.

BRIEF DESCRIPTION OF THE DRAWINGS

A full and enabling disclosure of the present invention, including the best mode thereof to one of ordinary skill in the art, is set forth more particularly in the remainder of the specification, which makes reference to the accompanying figures, in which:

FIGS. 2C-2H are, respectively, schematic illustrations of loudspeaker arrays as shown in FIG. 2A;

Figure 1:
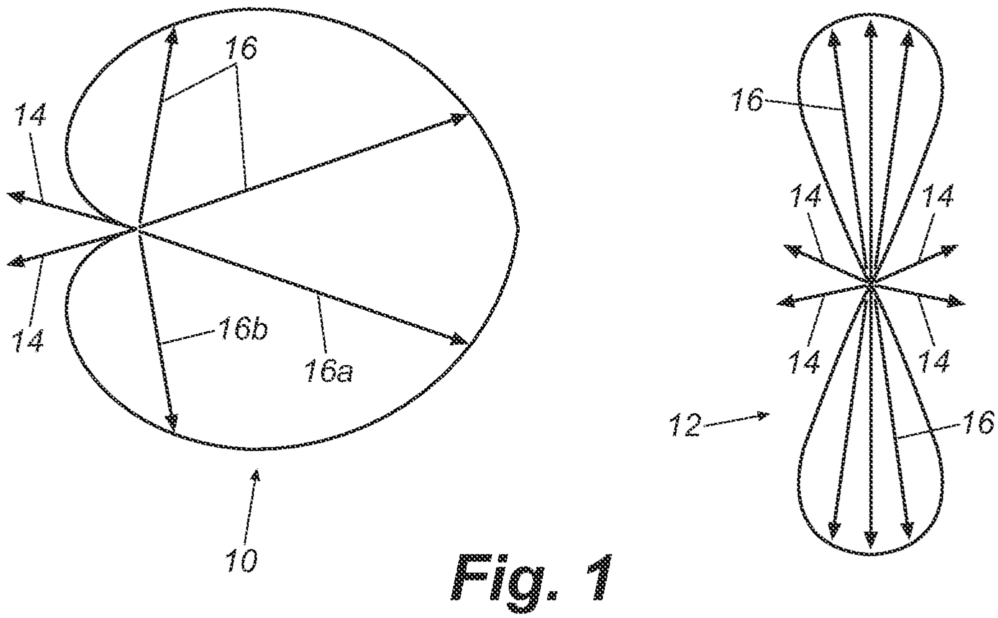
FIG. 1 illustrates polar plots of radiation patterns.

Repeat use of reference characters in the present specification and drawings is intended to represent same or analogous features or elements of the invention.

DETAILED DESCRIPTION

Reference will now be made in detail to certain embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the present disclosure, including the appended claims.

Though the elements of several views of the drawings herein may be shown and described as discrete elements in a block diagram and may be referred to as "circuitry," unless otherwise indicated, the elements may be implemented as one of, or a combination of, analog circuitry, digital circuitry, or one or more microprocessors executing software instructions. The software instructions may include digital signal processing (DSP) instructions. Unless otherwise indicated, signal lines may be implemented as discrete analog or digital signal lines, as a single discrete digital signal line with appropriate signal processing to process separate streams of audio signals, or as elements of a wireless communication system. Some of the processing operations may be expressed in terms of the calculation and application of coefficients. The equivalent of calculating and applying coefficients can be performed by other analog or digital signal processing techniques and are included within the scope of this patent application. Unless otherwise indicated, audio signals may be encoded in either digital or analog form; conventional digital-to-analog or analog-to-digital converters may not be shown in the figures. For simplicity of wording, "radiating acoustic energy corresponding to the audio signals" in a given channel or from a given array will be referred to as "radiating" the channel from the array.

Directional loudspeakers are loudspeakers that have a radiation pattern in which substantially more acoustic energy is radiated in some directions than in others. A directional array has multiple acoustic energy sources. In a directional array, over a range of frequencies in which the wavelengths of the radiated acoustic energy are large relative to the spacing of the energy sources with respect to each other, the pressure waves radiated by the acoustic energy sources destructively interfere, so that the array radiates more or less energy in different directions depending on the degree of destructive interference that occurs. The directions in which relatively more acoustic energy is radiated, for example directions in which the sound pressure level is within six dB (preferably between −6 dB and −4 dB, and ideally between −4 dB and −0 dB) of the maximum sound pressure level (SPL) in any direction at points of equivalent distance from the directional loudspeaker will be referred to as "high radiation directions." The directions in which less acoustic energy is radiated, for example, directions in which the SPL is at a level of a least −6 dB (preferably between −6 dB and −10 dB, and ideally at a level down by more than 10 dB, for example, −20 dB) with respect to the maximum in any direction for points equidistant from the directional loudspeaker, will be referred to as "low radiation directions." In all of the figures, directional loudspeakers are shown as having two or more cone-type acoustic drivers, 1.925 inches in cone diameter with about a two inch cone element spacing. The directional loudspeakers may be of a type other than cone-types, for example, dome-types or flat panel-types. Directional arrays have at least two acoustic energy sources, and may have more than two. Increasing the number of acoustic energy sources increases control over the radiation pattern of the directional loudspeaker, for example possibly achieving a narrower pattern or a pattern with a more complex geometry that may be desirable for a given application. In the embodiments discussed herein, the number of and orientation of the acoustic energy sources may be determined based on the environment in which the arrays are disposed. The signal processing necessary to produce directional radiation patterns may be established by an optimization procedure, described in more detail below, that defines a set of transfer functions that manipulate the relative magnitude and phase of the acoustic energy sources to achieve a desired result.

Directional characteristics of loudspeakers and loudspeaker arrays are typically described using polar plots, such as the polar plots of FIG. 1. Polar plot 10 represents the radiation characteristics of a directional loudspeaker, in this case a so-called "cardioid" pattern. Polar plot 12 represents the radiation characteristics of a second type of directional loudspeaker, in this case a dipole pattern. Polar plots 10 and 12 indicate a directional radiation pattern. The low radiation directions indicated by lines 14 may be, but are not necessarily, null directions. High radiation directions are indicated by lines 16. In the polar plots, the length of the vectors in the high radiation direction represents the relative amount of acoustic energy radiated in that direction, although it should be understood that this convention is used in FIG. 1 only. For example, in the cardioid polar pattern, more acoustic energy is radiated in direction 16*a* than in direction 16*b*.

Figure 2A:
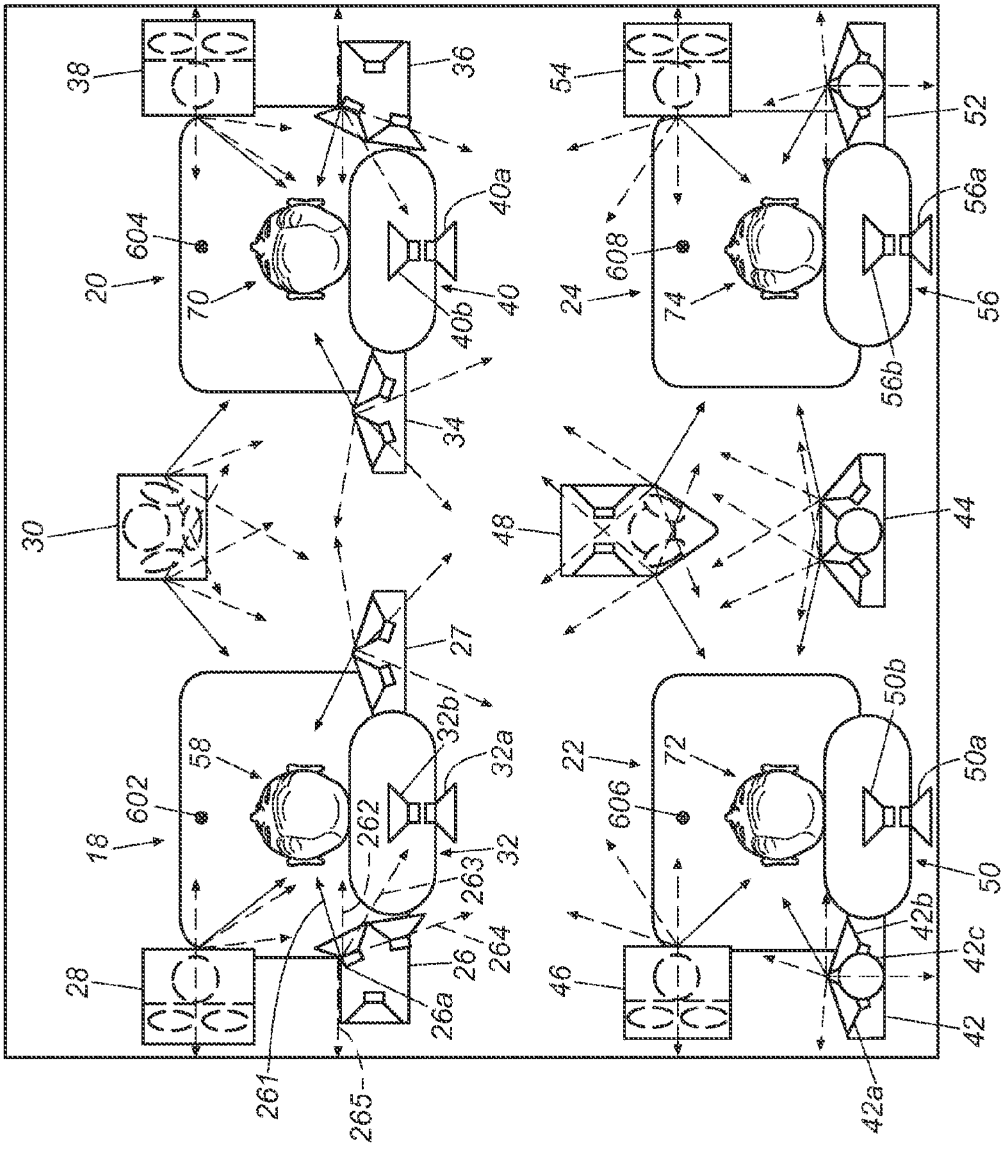
FIG. 2A is a schematic illustration of a vehicle loudspeaker array system in accordance with an embodiment of the present invention.

FIG. 2A is a diagram of a vehicle passenger compartment with an audio system. The passenger compartment includes four seat positions 18, 20, 22 and 24. Associated with seat position 18 are four directional loudspeaker arrays 26, 27, 28 and 30 that radiate acoustic energy into the vehicle cabin directionally at frequencies (referred to herein as "high" frequencies, in the presently described embodiment above about 125 Hz for arrays 28, 30, 38, 46, 48 and 54, and about 185 Hz for arrays 26, 27, 34, 36, 42, 44 and 52) generally above bass frequency ranges, and a directional loudspeaker array 32 that radiates acoustic energy in a bass frequency range (from about 40 Hz to about 180 Hz in the presently described embodiment). Similarly positioned are four directional loudspeaker arrays 34, 36, 38 and 30 for high frequencies, and directional array 40 for bass frequencies, associated with seating position 20, four directional loudspeakers 42, 44, 46 and 48 for high frequencies, and array 50 for low frequencies, associated with seat position 22, and four directional loudspeaker arrays 44, 52, 54 and 48 for high frequencies, and array 56 for bass frequencies, associated with seat position 24.

The particular configuration of array elements shown in the present Figures is dependent on the relative positions of the listeners within the vehicle and the configuration of the vehicle cabin. The present example is for use in a cross-over type sport utility vehicle. Thus, while the speaker element locations and orientations described herein comprise one embodiment for this particular vehicle arrangement, it should be understood that other array arrangements can be used in this or other vehicles (e.g. including but not limited to busses, vans, airplanes or boats) or buildings or other fixed audio venues, and for various number and configuration of seat or listening positions within such vehicles or venues, depending upon the desired performance and the vehicle or venue configuration. Moreover, it should also be understood that various configurations of speaker elements within a given array may be used and may fall within the scope of the present disclosure. Thus, while an exemplary procedure by which array positions and configurations may be selected, and an exemplary array arrangement in a four passenger vehicle, are discussed in more detail below, it should be understood that these are presented solely for purposes of explanation and not in limitation of the present disclosure.

The number and orientation of acoustic energy sources can be chosen on a trial and error basis until desired performance is achieved within a given vehicle or other physical environment. In a vehicle, the physical environment is defined by the volume of the vehicle's internal compartment, or cabin, the geometry of the cabin's interior and the physical characteristics of objects and surfaces within the interior. Given a certain environment, the system designer may make an initial selection of an array configuration and then optimize the signal processing for the selected configuration according to the optimization procedure described below. If this does not produce an acceptable performance, the system designer can change the array configuration and repeat the optimization. The steps can be repeated until a system is defined that meets the desired requirements.

Although the following discussion describes the initial selection of an array configuration as a step-by-step procedure, it should be understood that this is for purposes of explanation only and that the system designer may select an initial array configuration according to parameters that are important to the designer and according to a method suitable to the designer.

The first step in determining an initial array configuration is to determine the type of audio signals to be presented to listeners within the vehicle. For example, if it is desired to present only monophonic sound, without regard to direction (whether due to speaker placement or the use of spatial cues), a single speaker array disposed a sufficient distance from the listener so that the audio signal reaches both ears, or two speaker arrays disposed closer to the listener and directed toward the listener's respective ears, may be sufficient. If stereo sound is desired, then two arrays, for example on either side of the listener's head and directed to respective ears, could be sufficient. Similarly, if wide sound stage and front/back audio is desired, more arrays are desirable. If wide stage is desired in both front and rear, than a pair of arrays in the front and a pair in the rear are desirable.

Once the number of arrays at each listener position is determined, the general location of the arrays, relative to the listener, is determined. As indicated above, location relative to the listener's head may be dictated, to some extent, by the type of performance for which the speakers are intended. For stereo sound, for example, it may be desirable to place at least one array on either side of the listener's head, but where surround sound is desired, and/or where it is desired to create spatial cues, it may be desirable to place the arrays both in front of and behind the listener, and/or to the side of the listener, depending on the desired effect and the availability of positions in the vehicle at which to mount speakers.

Once the desired number of arrays and their general relative location are determined, the specific locations of the arrays in the vehicle are determined. As a practical matter, available positions for speaker placement in a vehicle may be limited, and compromises between what might be desired ideally from an acoustic standpoint and what is available in the vehicle may be necessary. Again, array locations can vary, but in the presently described embodiment, it is desired that each array directs the sound toward at least one of the listener's ears and avoids directing sound to the other listeners in the vehicle or toward near reflective surfaces. The effectiveness of a directional array in directing audio to a desired location while avoiding undesired locations increases where the array is disposed closer to the listener's head, since this increases the relative path length difference between the array's location and the locations to which it is and is not desired to radiate audio signals. Thus, in the presently described embodiment, it is desirable to dispose the arrays as close to the listener's head as possible. Referring to seat position 18, for example, arrays 26 and 27 are disposed in the seat headrest, very close to the listener's head. Front arrays 28 and 30 are disposed in the ceiling headliner, rather than in the front dash, since that position places the speakers closer to the listener's head than would be the case if the arrays were disposed in the front dash.

Once the array positions are established, the number and orientation of acoustic energy sources within the arrays are determined. One energy source, or transducer, in an array may direct an acoustic signal to one of the listener's ears, and such a transducer is referred to herein as the "primary" transducer. Where the element is a cone-type transducer, for example, the primary transducer may have its cone axis aligned with the listener's expected head position. It is not necessary, however, that the primary transducer be aligned with the listener's ear, and in general, the primary transducer can be identified by comparing the attenuation of the audio signal provided by each element in the array. To identify the primary element, respective microphones may be placed at the expected head positions of seat occupants 58, 70, 72 and 74. At each array, each element in the array is driven in turn, and the resulting radiated signal is recorded by each of the microphones. The magnitudes of the detected volumes at the other seat positions are averaged and compared with the magnitude of the audio received by the microphone at the seat position at which the array is located. The element within the array for which the ratio of the magnitude at the intended position to the magnitude (average) at the other positions is highest may be considered the primary element.

Each array has one or more secondary transducers that enhance the array's directivity. The manner by which multiple transducers control the width and direction of an array's acoustic pattern is known and is therefore not discussed herein. In general, however, the degree of control of width and direction increases with the number of secondary transducers. Thus, for instance, where a lesser degree of control is needed, an array may have fewer secondary transducers. Furthermore, the smaller the element spacing, the greater the frequency range (at the high end) over which directivity can be effectively controlled. Where, as in the presently described embodiments, a close element spacing (approximately two inches) reduces the high frequency arrays' efficiency at lower frequencies, the system may include a bass array at each seat location, as described in more detail below.

In general, the number and orientation of the secondary elements in a given array at a given seat position are chosen to reduce the radiation of audio from that array to expected occupant positions at the other seat positions. Secondary element numbers and orientation may vary among the arrays at a given seat position, depending on the varying acoustic environments in which the arrays are placed relative to the intended listener. For instance, arrays disposed in symmetric positions with respect to the listener (i.e. in similar positions with respect to, but on opposite side of, the listener) may be asymmetric (i.e. may have different number of and/or differently oriented transducers) with respect to each other in response to asymmetric aspects of the acoustic environment. In this regard, symmetry can be considered in terms of angles between a line extending from the array to a point at which it is desired to direct audio signals (such as any of the expected ear positions of intended listeners) and a line extending from the array to a point at which it is desired to reduce audio radiation (such as a near reflective surface and expected ear positions of the other listeners), as well as the distance between the array and a point to which it is desired to direct audio. The degree of control over an array's directivity needed to isolate that array's radiation output at a desired seat position increases as these angles decrease, as the number of positions that define such small angles increases, and as the distance between the array and a point at which it is desired to direct audio increases. Thus, when considering arrays at positions on opposite sides of a given listening position that exhibit asymmetries with respect to one or more of these parameters, the arrays may be asymmetric with respect to each other to account for the environmental asymmetry.

As should be understood in this art, reflections from vehicle surfaces relatively far from the intended listener are generally not of significant concern with regard to impairing the audio quality heard by the listener because the signal generally attenuates and is time-delayed such that the reflection does not cause noticeable interference. Near reflections, however, can cause interference with the intended audio, and a higher degree of directivity control for loudspeakers proximate such near reflective surfaces is desirable to achieve an acceptable level of isolation.

In general, in determining the number and orientation of secondary elements in a given array, it is considered that, to reduce leaked audio from the array, the secondary elements may be disposed to provide out-of-phase signal energy toward locations at which it is desired to reduce audio radiation, such as near reflective surfaces and the expected head positions of occupants in other seat positions. That is, the secondary elements may be located so that they radiate energy in the direction in which destructive interference is desired. Thus, where an array is located in a position close to such surfaces and where angles between lines from the array an points at which it is, and is not, desired to radiate audio signals are relatively small, more secondary elements may be desired, generally directed toward such surfaces and such undesired points, than in arrays having fewer such conditions.

Turning to the exemplary arrangement shown in the Figures, arrays 27 and 34 are disposed very close to their respective listeners, at inboard positions without near reflective surfaces, and are generally between their intended seat occupant (i.e. the occupant position at which audio signals are to be directed) and the other vehicle occupants (i.e. the positions at which audio leakage are to be reduced). Thus, there is a greater degree of spatial freedom to direct acoustic radiation to the target occupant without directing acoustic radiation to another occupant at an undesirable level, and the directivity control provided by a two-element directional array (i.e. an array having only one secondary element) is therefore sufficient. Nonetheless, it should be understood that additional loudspeaker elements may be used at these array positions to provide additional directivity control if desired.

Each of the outboard high frequency arrays 26, 28, 36, 38, 42, 46, 52 and 54 is near at least one such near reflective surface, and in addition, the arrays' respective intended listeners are aligned close to a line extending between the array and an unintended listener. Thus, a greater degree of control over the directivity of these arrays is desired, and the arrays therefore include a greater number of secondary transducers.

With regard to arrays 42 and 52, the third element in each array faces upward so that its axis is vertically aligned. The two elements in each array remaining aligned in the horizontal plane (i.e. the plane of the page of FIG. 2A) are disposed symmetrically with respect to a horizontal line bisecting the loudspeaker element pair in the vehicle's forward/rearward direction. Thus, the three speaker elements respectively face the intended occupant, the rear door window and the rear windshield, thereby facilitating directivity control to direct audio radiation to the seat occupant and reduce radiation to the window and rear windshield.

Each of the three center arrays 30, 48 and 44 can be considered a multi-element array with respect to each of the two seat positions served by the array. That is, referring to FIG. 2B, and as discussed in more detailed below, loudspeaker elements 30*a*, 30*b*, 30*c* and 30*d* radiate audio signals to both seat positions 18 and 20. Elements 48*a*, 48*b*, 48*c*, 48*d* and 48*e* radiate audio signals to both seat positions 22 and 24. Elements 44*a*, 44*b*, 44*c* and 44*d* radiate audio signals to both seat positions 22 and 24. Each of the center arrays is farther from the respective seat occupants than are arrays 26, 27, 28, 34, 36, 38, 42, 46, 52 and 54. Because of the greater distance to the listener, it is desirable to have greater precision in directing the audio signals from the center arrays to the desired seat occupants so that radiation to the other seat occupants may be reduced. Accordingly, a greater number of acoustic elements are chosen for the center arrays.

Accordingly, the system designer makes an initial selection of the number of arrays, the location of those arrays, the number of transducers in each array, and the orientation of the transducers within each array, based on the type of audio to be presented to the listener, the configuration of the vehicle and the location of listeners within the vehicle. Given the initial selection, the signal processing to drive the arrays is selected through an optimization procedure described in detail below.

FIGS. 2A-2H illustrate an array configuration selected for a crossover-type sport utility vehicle. As indicated above, the position of each array in the vehicle is chosen based on the general need or desire to place speakers in front of, behind and/or to the sides of each listener, depending on the desired audio performance. The speakers' particular positions are finally determined, given any restrictions arising from desired performance, based on physical locations available within the vehicle. Because, once the speakers have been located, the signal processing used to drive the arrays is calibrated according to the optimization procedure described below, it is unnecessary to determine the vectors and distances that separate the arrays from each other or that separate the arrays from the seat occupants, or the relative positions and orientations of elements within each array, although a procedure in which array positions are selected in terms of such distances, vectors, positions and orientations is within the scope of the present disclosure. Accordingly, the example provided below describes a general placement of speaker arrays for purposes of illustration and does not provide a scale drawing.

Figure 2B:
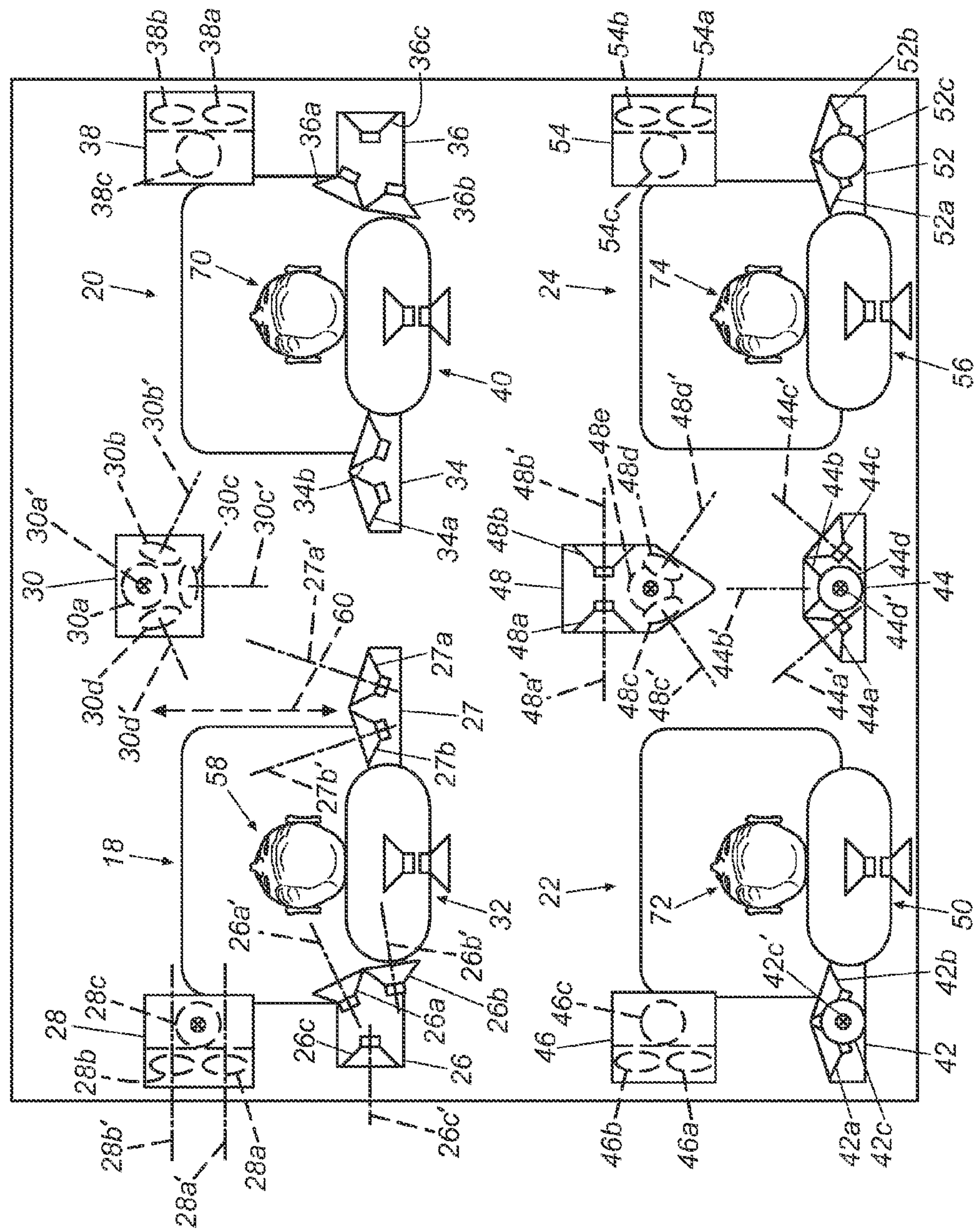
FIG. 2B is a schematic illustration of the vehicle loudspeaker array system as in FIG. 2A.

Referring more specifically to seat position 18 in FIG. 2B, loudspeaker array 26 is a three-element array, and loudspeaker array 27 is a two-element array, positioned adjacent to and on either side of the expected head position of an occupant 58 of seat position 18. Arrays 26 and 27 are positioned, for example, in the seat back, in the seat headrest, on the side of the headrest, in the headliner, or in some other similar location. In one embodiment, the head rest at each seat wraps around to the sides of the seat occupants' head, thereby allowing disposition of the arrays closer to the occupant's head and partially blocking acoustic energy from the other seat locations.

Array 27 is comprised of two cone-type acoustic drivers 27*a* and 27*b* that are disposed so that the respective axes 27*a*' and 27*b*' are in the same plane (which extends horizontally through the vehicle cabin, i.e. parallel to the plane of the page of FIG. 2B) and are symmetrically disposed on either side of a line 60 that extends in the forward and rearward directions of the vehicle between elements 27*a* and 27*b*. Array 27 is mounted in the vehicle offset in a side direction from a line (not shown) that extends in the vehicle's forward and rearward directions (i.e. parallel to line 60) and passing through an expected position of the head of seat occupant 58, and rearward of a side-to-side line (not shown) transverse to that line that also passes through the expected head position of occupant 58.

Loudspeaker array 26 is comprised of three cone-type acoustic drivers 26*a*, 26*b* and 26*c* disposed so that their respective cone axes 26*a*', 26*b*' and 26*c*' are in the horizontal plane, acoustic element 26*c*' faces away from occupant 58, and axis 26*c*' is normal to line 60. Element 26*b* faces forward, and its axis 26*b*' is parallel to line 60 and normal to axis 26*c*'. Element 26*b* faces the left ear of the expected head position of occupant 58 so that cone axis 26*b*' passes through the ear position. Array 26 is mounted in the vehicle offset to the right side of the forward/rearward line passing through the head of occupant 58 and rearward of the transverse line that also passes through the head of occupant 58. As indicated herein, for example where the seatback or headrest wraps around the occupant's head, arrays 26 and 27 may both be aligned with or forward of the transverse line.

FIG. 2C provides a schematic plan view of seat position 18 (see also FIG. 2B) from the perspective of seat position 20. FIG. 2D provides a schematic illustration of loudspeaker array 28 taken from the perspective of seat position 22. Referring to FIGS. 2B, 2C and 2D, speaker array 28 includes three cone-type acoustic elements 28*a*, 28*b* and 28*c*. Elements 28*a* and 28*b* face downward at an angle with respect to horizontal and are disposed so that their cone axes 28*a*' and 28*b*' are parallel to each other. Acoustic element 28*c* faces directly downward so that its cone axis 28*c*' intersects the plane defined by axes 28*a*' and 28*b*'. As shown in FIG. 2C, acoustic elements 28*a* and 28*b* are disposed symmetrically on either side of element 28*c*.

Loudspeaker array 28 is mounted in the vehicle headliner just inboard of the front driver's side door. Element 28*c* is disposed with respect to elements 28*a* and 28*b* so that a line 28*d* passing through the center of the base of element 28*c* intersects a line 28*e* passing through the centers of the bases of acoustic elements 28*a* and 28*b* at a right angle and at a point evenly between the bases of elements 28*a* and 28*b*.

Referring to FIG. 2B and seat position 20, loudspeaker array 34 is mounted similarly to loudspeaker array 27 and is disposed with respect to seat occupant 70 similarly to the disposition of array 27 with respect to occupant 58 of seat position 18, except that array 34 is to the left of occupant 70. Both arrays 34 and 27 are on the inboard side of their respective seat positions.

Arrays 36 and 38, and arrays 26 and 28, are on the outboard sides of their respective seat positions. Array 36 is mounted similarly to array 26 and is disposed with respect to occupant 70 similarly to the disposition of array 26 with respect to occupant 58. Array 38 is mounted similarly to array 28 and is disposed with respect to occupant 70 similarly to the disposition of array 28 with respect to occupant 58. The construction (including the number, arrangement and disposition of acoustic elements) of arrays 34, 36 and 38 is the mirror image of that of arrays 27, 26 and 28, respectively, and is therefore not discussed further herein.

Referring to seat positions 22 and 24, arrays 46 and 54 are mounted similarly to arrays 28 and 38 and are disposed with respect to seat occupants 72 and 74 similarly to the dispositions of arrays 28 and 38 with respect to occupants 58 and 70, respectively. The construction (including the number, arrangement and disposition of acoustic elements) of arrays 46 and 54 is the same as that described above with regard to arrays 28 and 38 and is not, therefore, discussed further herein.

Array 42 includes three cone-type acoustic elements 42*a*, 42*b* and 42*c*. Array 42 is mounted in a manner similar to outboard arrays 26 and 36. Acoustic elements 42*a* and 42*b*, however, are arranged with respect to each other and occupant 72 (on the outboard side) in the same manner as elements 27*a* and 27*b* are disposed with respect to each other and with respect to occupant 58 (on the inboard side), except that elements 42*a* and 42*b* are disposed on the outboard side of their seat position. The cone axes of elements 42*a* and 42*b* are in the horizontal plane. Acoustic element 42*c* faces upward, as indicated by its cone axis 42*c'*.

Outboard array 52 is mounted similarly to outboard array 42 and is disposed with respect to occupant 74 of seat position 24 similarly to the disposition of array 42 with respect to occupant 72 of seat position 22. The construction of array 52 (including the number, orientation and disposition of acoustic elements) is the same as that discussed above with respect to array 42 and is not, therefore, discussed further herein.

Still referring to FIG. 2B, array 44 is preferably disposed in the seatback or headrest of a center seat position, console or other structure between seat positions 22 and 24 at a vertical level approximately even with arrays 42 and 52.

Array 44 is comprised of four cone-type acoustic elements 44*a*, 44*b*, 44*c* and 44*d*. Elements 44*a*, 44*b* and 44*c* face inboard and are disposed so that their respective cone axes 44*a*', 44*b*' and 44*c*' are in the horizontal plane. Axis 44*b*' is parallel to line 60, and elements 44*a* and 44*c* are disposed symmetrically on either side of element 44*b* so that the angle between axes 44*a*' and 44*c*' is bisected by axis 44*b*'. Element 44*d* faces upward so that its cone axis 44*d*' is perpendicular to the horizontal plane. Axis 44*d*' intersects the horizontal plane of axes 44*a*', 44*b*' and 44*c*'. Axis 44*d*' intersects axis 44*b*' and is rearward of the line intersecting the centers of the bases of elements 44*a* and 44*c*.

Figure 2F:
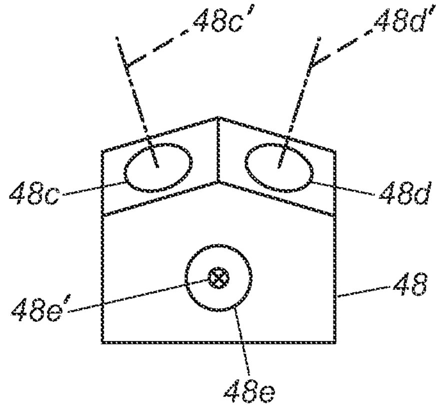

FIG. 2E provides a schematic plan view of the side of loudspeaker array 48 from the perspective of a point between seat positions 20 and 24. FIG. 2F provides a bottom schematic plan view of loudspeaker array 48. Referring to FIGS. 2B, 2E and 2F, loudspeaker array 48 is disposed in the vehicle headliner between a sun roof and the rear windshield (not shown). Array 48 includes five cone-type acoustic elements 48*a*, 48*b*, 48*c*, 48*d* and 48*e*. Elements 48*a* and 48*b* face toward opposite sides of the array so that their axes 48*a*' and 48*b*' are coincident and are located in a plane parallel to the horizontal plane. Array 48 is disposed evenly between seat positions 22 and 24. A vertical plane normal to the vertical plane including line 48*a*'/48*b*' and passing evenly between elements 48*a* and 48*b* includes axes 44*b*' and 44*d*' of elements 44*b* and 44*d* of array 44.

Element 48*e* opens downward, so that the element's cone axis 48*e*' is vertical. Element 48*d* faces seat position 24 at a downward angle. Its axis 48*d*' is aligned generally with the expected position of the left ear of seat occupant 74 at seat position 24. Element 48*c* faces toward seat position 22 at a downward angle. It axis 48*c*' is aligned generally with the expected position of the right ear of seat occupant 72 at seat position 22. The position and orientation of element 48*c* is symmetric to that of element 48*d* with respect to a vertical plane including lines 44*d*' and line 48*e'*.

Figure 2G:
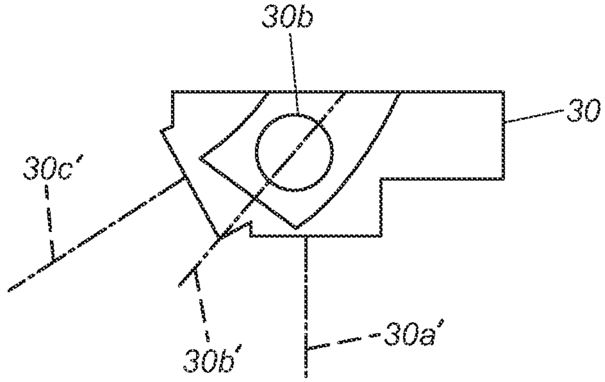
Figure 2H:
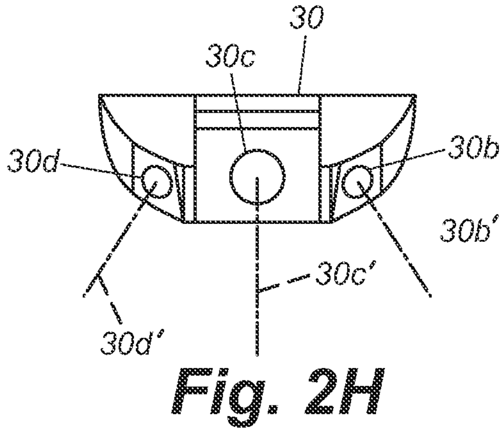

FIG. 2G provides a schematic side view of loudspeaker array 30 from a point in front of seat position 20. FIG. 2H provides a schematic plan view of array 30 from the perspective of array 48. Loudspeaker array 30 is disposed in the vehicle headliner in a position immediately in front of a vehicle sunroof, between the sunroof and the front windshield (not shown).

Loudspeaker array 30 includes four cone-type acoustic elements 30*a*, 30*b*, 30*c* and 30*d*. Element 30*a* faces downward into the vehicle cabin area and is disposed so that its cone axis 30*a*' is normal to the horizontal plane and is included in the plane that includes lines 48*e*' and 44*d*'. Acoustic element 30*c* faces rearward at a downward angle similar to that of elements 30*b* and 30*d*. Its cone axis 30*c*' is included in a vertical plane that includes axes 30*a*', 48*e*' and 44*d'*.

Acoustic element 30*b* faces seat position 20 at a downward angle. Its cone axis 30*b*' is aligned generally with the expected position of the left ear of seat occupant 70 at seat position 20.

Acoustic element 30*d* is disposed symmetrically to element 30*b* with respect to the vertical plane that includes lines 30*a*', 48*e*' and 44*d*'. Its cone axis 30*d*' is aligned generally with the expected position of the right ear of seat occupant 58 of seat position 18.

Although the axes of the elements of arrays 26, 27, 34 and 36, elements 42*a* and 42*b* of array 42, elements 44*a*, 44*b* and 44*c* of array 44, and elements 52*a* and 52*b* are described herein as being within the plane of the paper in FIG. 2B, this is based on an assumption that the expected ear positions for seat occupants 58, 70, 72 and 74 are in the same plane. To the extent these speaker arrays are below the horizontal plane of the occupants' expected ear positions, these arrays may be tilted, so that the axes of the "horizontal elements" are directed slightly upward and so that the axis of the primary element of each array is coincident with the respective target occupant's ear. As apparent from FIG. 2B, this would cause the axes of elements 42*c*, 44*b* and 52*c* to move slightly off of vertical.

As described in more detail below, the loudspeaker arrays illustrated in FIGS. 2A and 2B are driven so as to facilitate radiation of desired audio signals to the occupants of the seat positions local to the various arrays while simultaneously reducing acoustic radiation to the seat positions remote from those arrays. In this regard, arrays 26, 27 and 28 are local to seat position 18. Arrays 34, 36 and 38 are local to seat position 20. Arrays 42 and 46 are local to seat position 22, and arrays 52 and 54 are local to seat position 24. Array 30 is local to seat position 18 and, with respect to acoustic radiation from array 30 intended for seat position 18, remote from seat positions 20, 22 and 24. With respect to acoustic radiation intended for seat position 20, however, array 30 is local to seat position 20 and remote from seat positions 18, 22 and 24. Similarly, each of speaker arrays 44 and 48 is local to seat position 22 with regard to acoustic radiation from those speaker arrays intended for seat position 22 and is remote from seat positions 18, 20 and 24. With regard to acoustic radiation intended for seat position 24, however, each of arrays 44 and 48 is local to seat position 24 and remote from seat positions 18, 20 and 22.

As discussed above, the particular positions and relative arrangement of speaker arrays, and the relative positions and orientations of the elements within the arrays, is chosen at each seat position to achieve a level of audio isolation of each seat position with respect to the other seat positions. That is, the array configuration is selected to reduce leakage of audio radiation from the arrays at each seat position to the other seat positions in the vehicle. It should be understood by those skilled in the art, however, that it is not possible to completely eliminate all radiation of audio signals from arrays at one seat position to the other seat positions. Thus, as used herein, acoustic "isolation" of one or more seat positions with respect to another seat position refers to a reduction of the audio leaked from arrays at one seat position to the other seat positions so that the perception of the leaked audio signals by occupants at the other seat positions is at an acceptably low level. The level of leaked audio that is acceptable can vary depending on the desired performance of a given system.

Figure 4A:
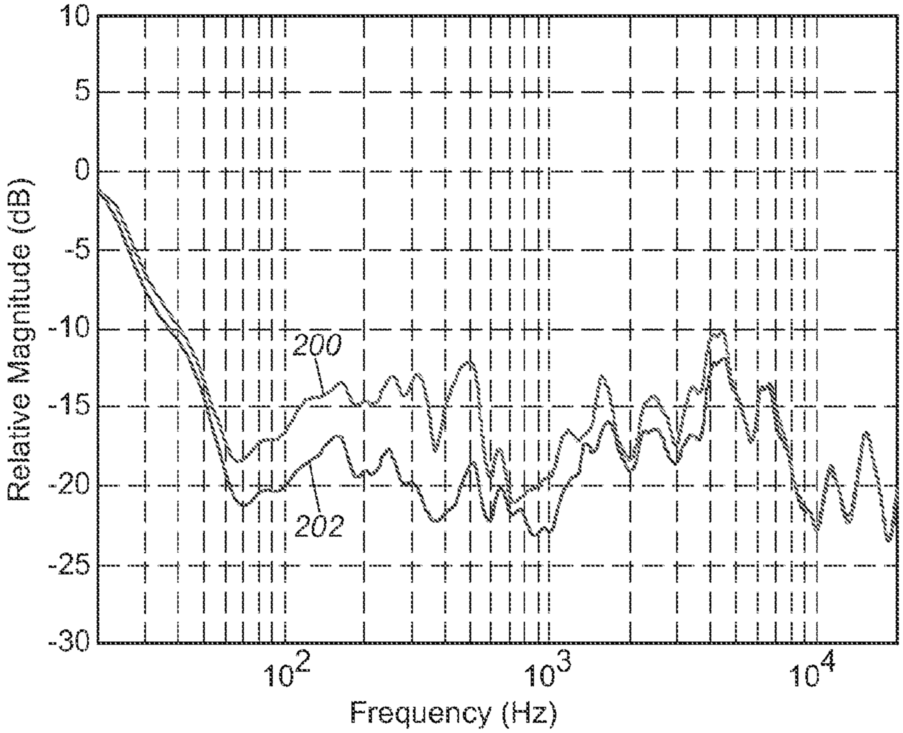
FIG. 4A is a plot of comparative magnitude plot for one of the speaker arrays shown in FIG. 2A.

For instance, referring to FIG. 4A, assume that all loudspeaker elements shown in the arrangement of FIG. 2B are disabled, except for element 36*b* of array 36. Respective microphones are placed at the expected head positions of seat occupants 58, 70, 72 and 74. An audio signal is driven through speaker element 36*b* and recorded by each of the microphones. The magnitude of the detected volumes at positions 58, 72 and 74 are averaged and compared with the magnitude of the audio received by the microphone at seat position 70. Line 200 represents the attenuation (in dB) of the average signal at seat positions 58, 72 and 74, as compared to the magnitude of the audio detected at seat position 70. In other words, line 200 represents the attenuation within the vehicle cabin from speaker position 36*b* when the directivity controls discussed in more detail below are not applied. Upon activation of speaker elements 36*a* and 36*c* with such directivity controls, however, attenuation increases, as indicated by line 202. That is, the magnitude of the audio leaked from seat position 20 to the other seat positions, as compared to the audio delivered directly to seat position 20, is reduced when a directional array is applied at the speaker position.

Comparing lines 200 and 202, from about 70 Hz to about 700 Hz, the directivity array arrangement as described herein generally reduces leaked audio from about −15 dB to about −20 dB. Between about 700 Hz to about 4 kHz, the directivity array improves attenuation by about 2 to 3 dB. While the attenuation performance is not, therefore, as favorable as at the lower frequencies, it is nonetheless an improvement. Above approximately 4 kHz, or higher frequencies for other transducers, the transducers are inherently sufficiently directive that the leakage audio is generally smaller than at low frequencies, provided the transducers are pointed toward the area to which it is desired to radiate audio.

Of course, the level of the leaked sound that is deemed acceptable can vary depending on the level of performance desired for a given system. In the presently described embodiment, it is desired to reduce leakage of sound from each seat position to each other seat position to approximately 10-15 dB or below with respect to the other seat position's audio. If an occupant of a particular seat position disables the audio to its seat position, that occupant will likely hear some degree of sound leakage from the other seat positions (depending on the level of ambient noise), but this does not mean his seat position is not isolated with respect to the other seat positions if the sound reduction is otherwise attenuated within the desired performance level.

Within the about 125/185 Hz to about 4 kHz range, and referring again to FIGS. 2A and 2B, directivity is controlled through selection of filters that are applied to the input signals to the elements of arrays 26, 27, 28, 30, 34, 36, 38, 42, 46, 44, 48, 52 and 54. These filters filter the signals that drive the transducers in the arrays. In general, for a given speaker array element, the overall transfer function ($Y_k$) is a ratio of the magnitude of the element's input signal and the magnitude of the audio signal radiated by the element, and the difference of the phase of the element's input signal and the signal radiated by the element, measured at some point k in space. The magnitude and phase of the input signal are known, and the magnitude and phase of the radiated signal at point k can be measured. This information can be used to calculate the overall transfer function $Y_k$, as should be well understood in the art.

In the presently described embodiment, the overall transfer function $Y_k$ of a given array can be considered the combination of an acoustic transfer function and a transfer function embodied by a system-defined filter. For a given speaker element within the array, the acoustic transfer function is the comparison between the input signal and the radiated signal at point k, where the input signal is applied to the element without processing by the filter. That is, it is the result of the speaker characteristics, the speaker enclosure, and the speaker element's environment.

The filter, for example an infinite impulse response (IIR) filter implemented in a digital signal processor disposed between the input signal and the speaker element, characterizes the system-selectable portion of the overall transfer function, as explained below. Although the present embodiment is described in terms of IIR filters, it should be understood that finite impulse response filters could be used. Moreover, a suitable filter could be applied by analog, rather than digital, circuitry. Thus, it should be understood that the present description is provided for purposes of explanation rather than limitation.

The system includes a respective IIR filter for each loudspeaker element in each array. Within each array, all IIR filters receive the same audio input signal, but the filter parameter for each filter can be chosen or modified to select a transfer function or alter a transfer function in a desired way, so that the speaker elements are driven individually and selectively. Given a transfer function, one skilled in the art should understand how to define a digital filter, such as an IIR, FIR or other type of digital filter, or analog filter to effect the transfer function, and a discussion of filter construction is therefore not provided herein.

In the presently described embodiment, the filter transfer functions are defined by a procedure that optimizes the radiation of audio signals to predefined positions within the vehicle. That is, given that the location of each array within the vehicle cabin has been selected as described above and that the expected head positions of the seat occupants, as well as any other positions within the vehicle at which it is desired to direct or reduce audio radiation, are known, the filter transfer function for each element in each array can be optimized. Taking array 26 as an example, and referring to FIG. 2A, a direction in which it is desired to direct audio radiation is indicated by a solid arrow, whereas the directions in which it is desired to reduce radiation are indicated by dashed arrows. In particular, arrow 261 points toward the expected left ear position of occupant 58. Arrow 262 points toward the expected head position of occupant 70. Arrow 263 points toward the expected head position of occupant 74. Arrow 264 points toward the expected head position of occupant 72, and arrow 265 points toward a near reflective surface (i.e. a door window). In one embodiment of the optimization procedure described below, near reflective surfaces are not considered as desired low radiation positions in-and-of themselves, since the effects of near reflections upon audio leaked to the desired low radiation seat positions are accounted for by including those seat positions as optimization parameters. That is, the optimization reduces audio leaked to those seat positions, whether the audio leaks by a direct path or by a near reflection, and it is therefore unnecessary to separately consider the near reflection surfaces. In another embodiment, however, near reflection surfaces are considered as optimization parameters because such surfaces can inhibit the effective use of spatial cues. Thus, where it is desired to employ spatial cues, it may be desirable to include near reflective surfaces as optimization parameters so as to reduce radiation to those surfaces in-and-of themselves. Accordingly, while the discussion below includes near reflection surfaces in describing optimization parameters, it should be understood that this is optional between the two embodiments.

Figure 3A:
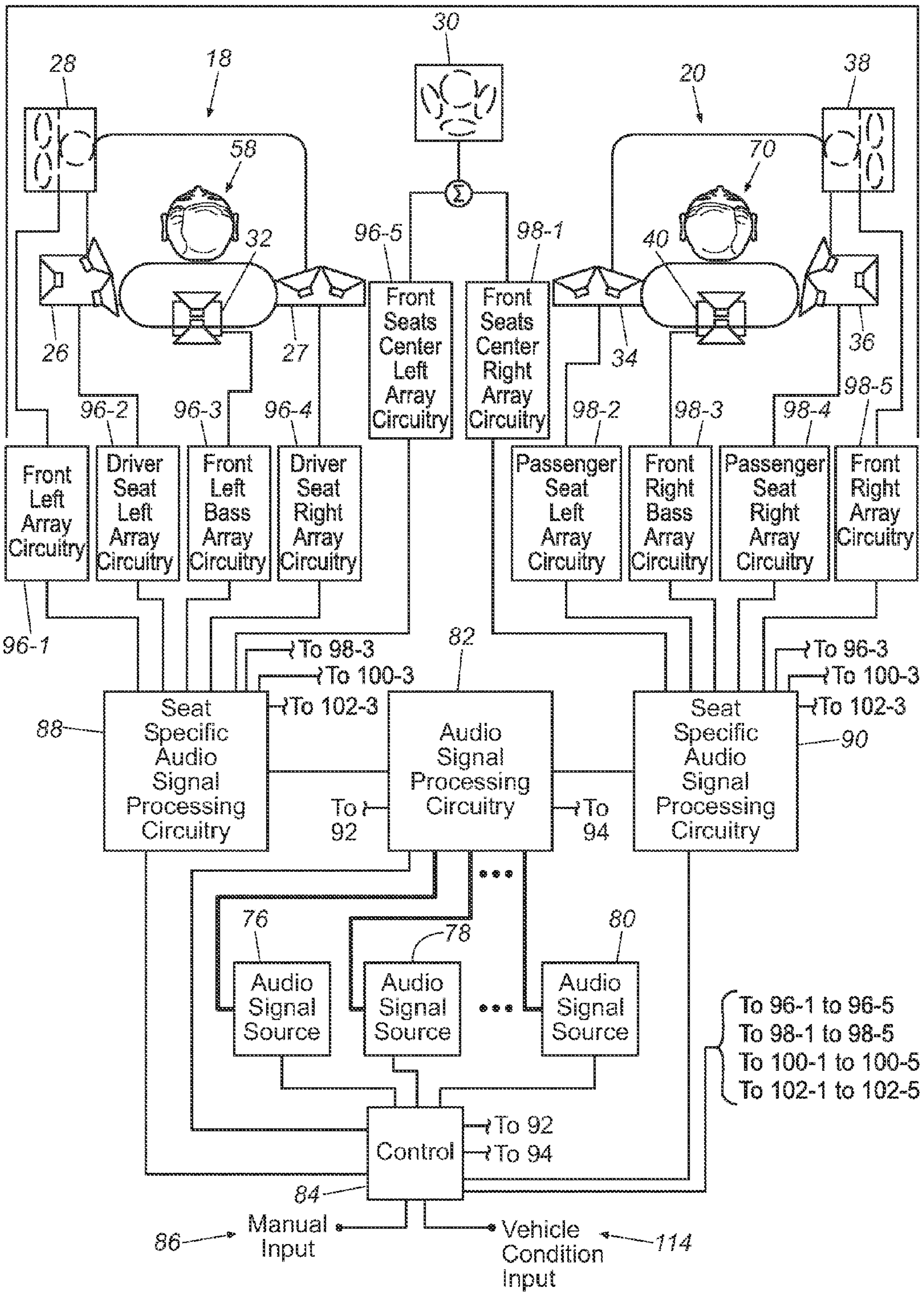
FIGS. 3A-3J are, respectively, partial block diagrams of the vehicle loudspeaker array system as in FIG. 2A, with respective block diagram illustrations of audio circuitry associated with the illustrated loudspeaker arrays.
Figure 3B:
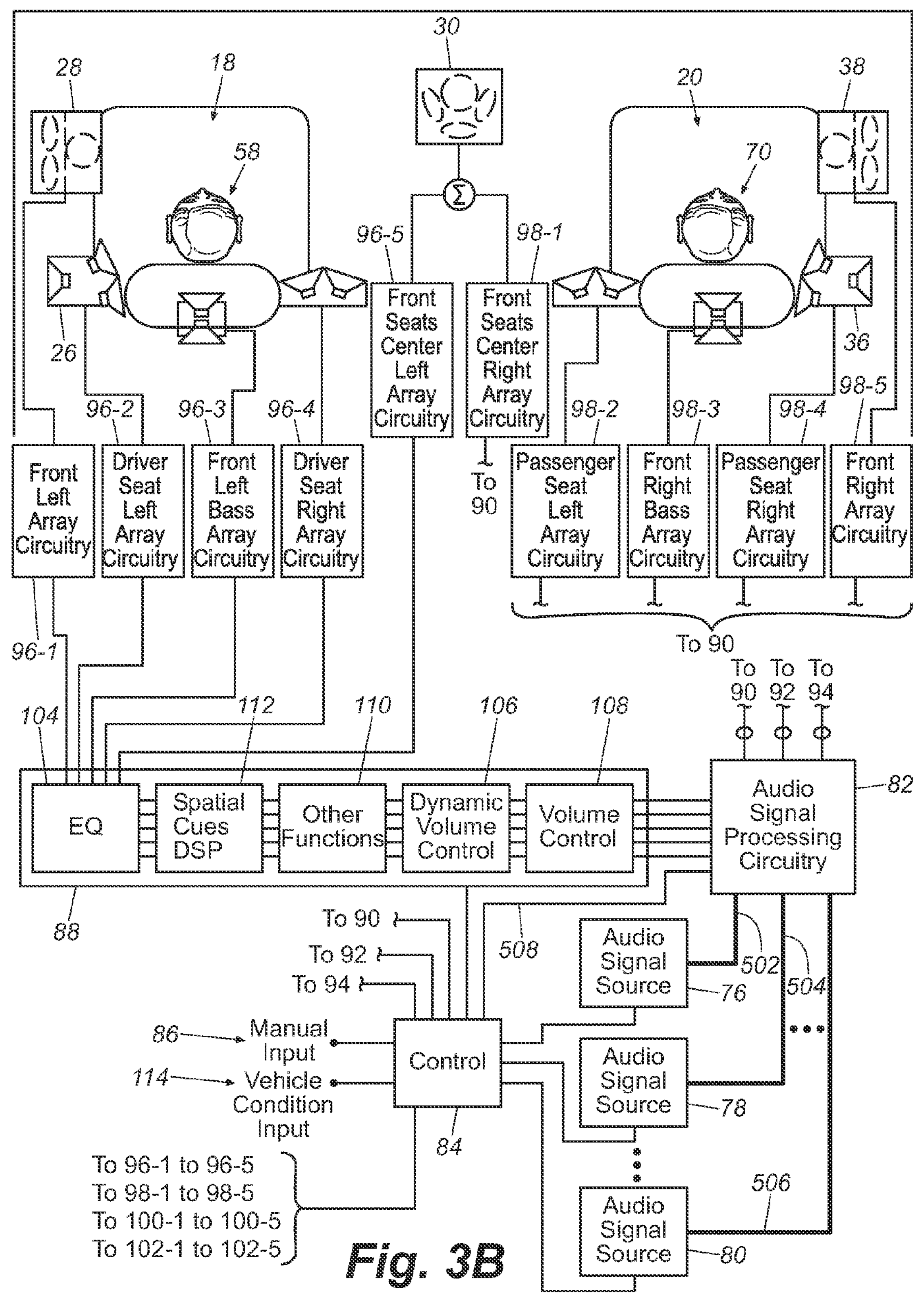
Figure 3C:
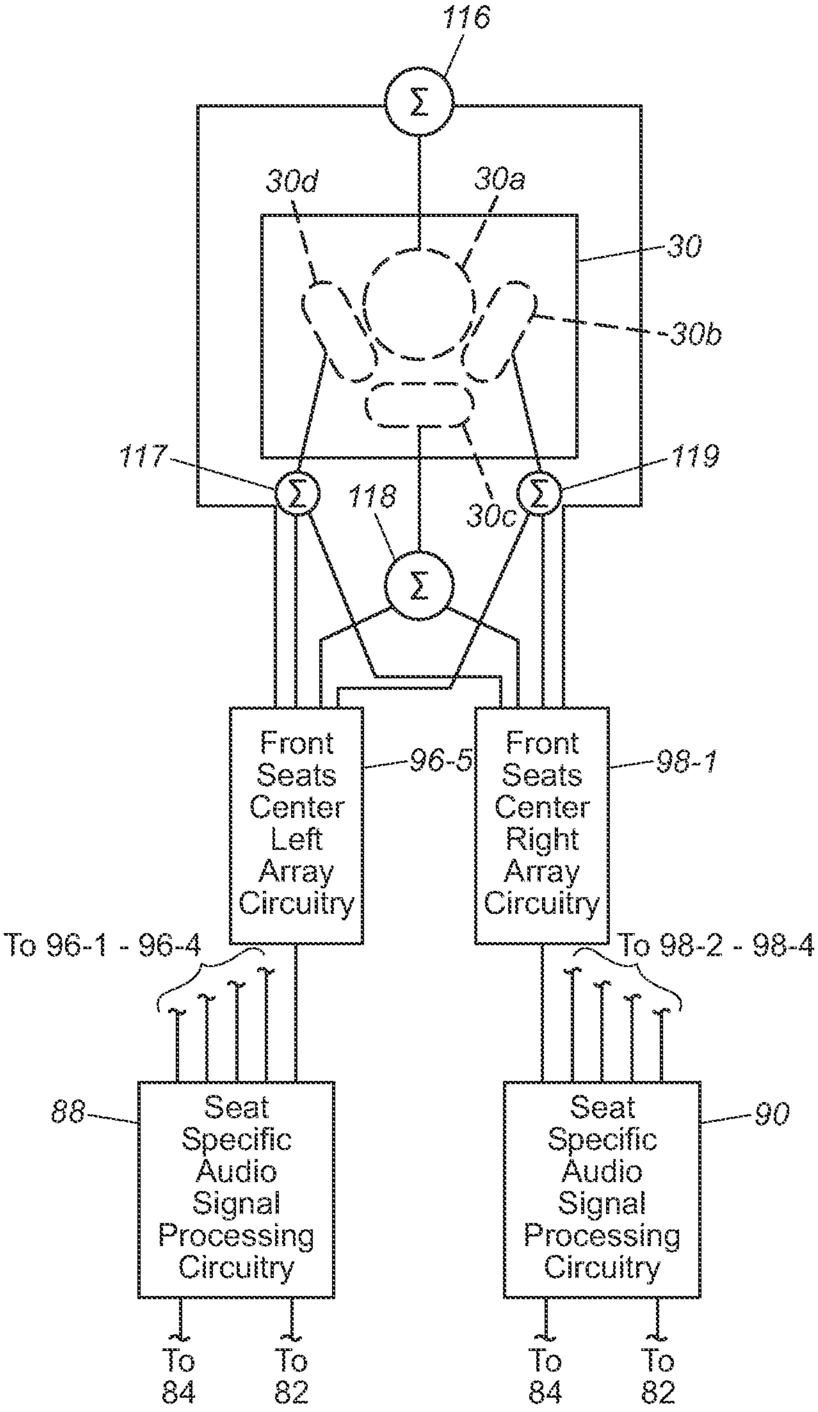
Figure 3D:
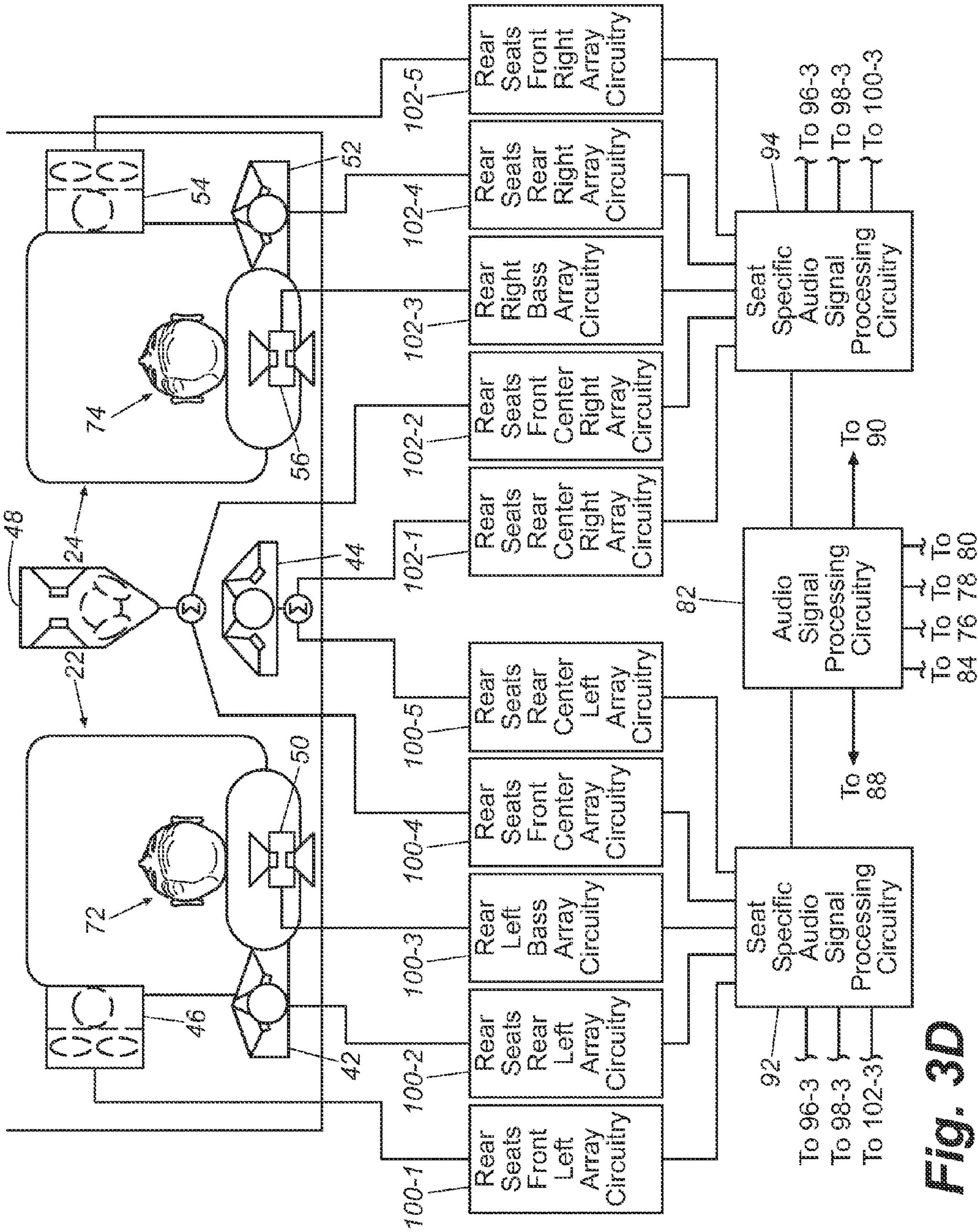
Figure 3E:
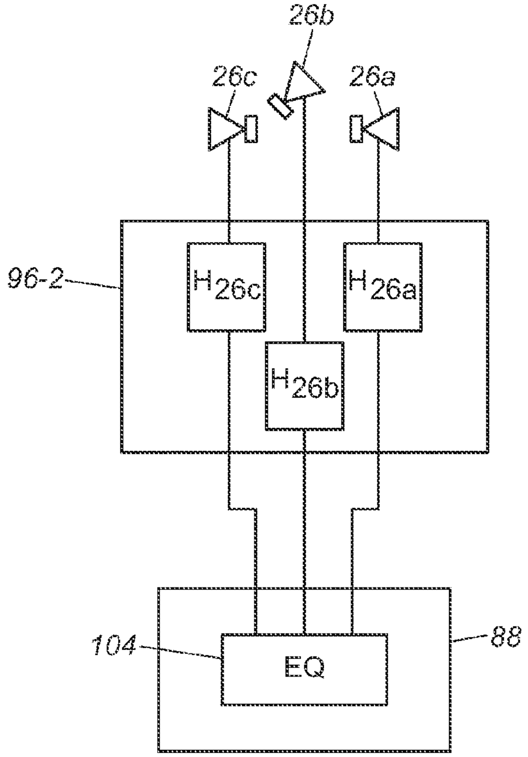

As a first step in the optimization procedure, and referring also to FIG. 3E, a first speaker element (preferably the primary element, in this instance element 26*b*) is considered. All other speaker elements in array 26, and in all the other arrays, are disabled. The IIR filter $H_{26b}$, which is defined within array circuitry (e.g. a digital signal processor) 96-2, for element 26*b* is initialized to the identity function (i.e. unity gain with no phase shift) or is disabled. That is, the IIR filter is initialized so that the system transfer function $H_{26b}$ transfers the input audio signal to element 26*b* without change to the input signal's magnitude and phase. As indicated below, $H_{26b}$ is maintained at unity in the present example and therefore does not change, even during the optimization. It should be understood, however, that $H_{26b}$ could be optimized and, moreover, that the starting point for the filter need not be the identity function. That is, where the system optimizes a filter function, the filter's starting point can vary, provided the filter transfer function modifies to an acceptable performance.

A microphone is sequentially placed at a plurality of positions (e.g. five) within an area (indicated by arrow 261) in which the left ear of occupant 58 is expected. With the microphone at each position, element 26*b* is driven by the same audio signal at the same volume, and the microphone receives the resulting radiated signal. The transfer function is calculated using the magnitude and phase of the input signal and the magnitude and phase of the output signal. A transfer function is calculated for each measurement.

Because filter $H_{26b}$ is set to the identity function, the calculated transfer functions are the acoustic transfer functions for each of the five measurements. The calculated acoustic transfer functions are "$G_{0pk}$," where "0" indicates that the transfer function is for an area to which it is desired to radiate audible signals, "p" indicates that the transfer function is for a primary transducer, and "k" refers to the measurement position. In this example, there are five measurement positions k, although it should be understood that any desired number of measurement may be taken, and the measurements therefore result in five acoustic transfer functions.

The microphone is then sequentially placed at a plurality of positions (e.g. ten) within the area (indicated by arrow 262) in which the head of occupant 70 is expected, and element 26*b* is driven by the same audio signal, at the same volume, as in the measurements for the left ear position of occupant 58. The ten positions may be selected as ten expected positions for the center of the head of occupant 70, or measurements can be made at five expected positions for the left ear of occupant 70 and five expected positions for the right ear of occupant 70 (e.g. head tilted forward, tilted back, tilted left, tilted right, and upright). At each position, the microphone receives the radiated signal, and the transfer function is calculated for each measurement. The measured acoustic transfer functions are "$G_{1pk}$," where "1" indicates the transfer functions are to a desired low radiation area.

The microphone is then sequentially placed at a plurality of positions (e.g. ten) within an area (indicated by arrow 263) in which the head of occupant 74 is expected (either by taking ten measurements at the expected positions of the center of the head of occupant 74 or five expected positions of each ear), and element 26*b* is driven by the same audio signal, at the same volume, as in the measurements for the ear position of occupant 58. At each position, the microphone receives the radiated signal, and the transfer function is calculated for each measurement. The measured acoustic transfer functions are "$G_{1pk}$."

The microphone is then sequentially placed at a plurality of positions (e.g. ten) within an area (indicated by arrow 264) in which the head of occupant 72 is expected, and element 26*b* is driven by the same audio signal, at the same volume, as in the measurements for the ear position of occupant 58. At each position, the microphone receives the radiated signal, and the transfer function is calculated for each measurement. The measured acoustic transfer functions are $G_{1pk}$.

The microphone is then sequentially placed at a plurality of positions (e.g. ten) within the area (indicated by arrow 265) at the near reflective surface (i.e. the front driver window), and element 26*b* is driven by the same audio signal, at the same volume, as in the measurements for the ear position of occupant 58. At each position, the microphone receives the radiated signal, and the transfer function is calculated for each measurement. The measured acoustic transfer functions are "$G_{1pk}$." Acoustic transfer functions could also be determined for any other near reflection surfaces, if present.

Accordingly, the processor calculates five acoustic transfer functions $G_{0pk}$ and forty acoustic transfer functions $G_{1pk}$.

Next, IIR filter 26*a* is set to the identity function, and all other speaker elements in the array 26, and in all the other arrays, are disabled. The microphone is sequentially placed at the same five positions within the area indicated at 261, in which the left ear of occupant 58 is expected, and element

26*a* is driven by the same audio signal, at the same volume, as during the measurement of the element 26*b*, when the microphone is at each of the five positions. This measures the five acoustic transfer functions "$G_{0c(26a)k}$," where "$_{c(26a)}$" indicates that the acoustic transfer function applies to a secondary, or cancelling, element 26*a*.

The procedure for determining acoustic transfer functions at the desired low radiation positions described above for element 26*b* is repeated for element 26*a* at the same microphone positions, resulting in forty acoustic transfer functions $G_{1c(26a)k}$ for element 26*a*.

The procedure is repeated for element 26*c*, resulting in five acoustic transfer functions $G_{0c(26c)k}$ for the desired high radiation positions and forty acoustic transfer functions for the desired low radiation positions, for the same microphone positions as measured for elements 26*a* and 26*b*.

This procedure results in 135 acoustic transfer functions for the overall array with respect to forty-five measurement positions k. Considering each of the five measurement positions in the desired radiation area, the transfer function at position area k is:

$$Y_{0k}=G_{0pk}H_{26b}+G_{0c(26a)k}H_{26a}+G_{0c(26c)k}H_{26c}$$

Where $G_{0c(26a)k}H_{26a}$ refers to the acoustic transfer function measured at the particular position k for element 26*a*, multiplied by the IIR filter transfer function $H_{26a}$, and $G_{0c(26c)k}H_{26c}$ refers to the acoustic transfer function measured at position k for element 26*c*, multiplied by IIR filter transfer function $H_{26c}$.

In the presently described embodiment, all primary element filters are held constant at the identity function, although it should be understood that this is not necessary and that the filters for the primary transducers could be optimized along with the filters for the secondary elements. Under this assumption, however, the transfer functions for point k becomes:

$$Y_{0k}=G_{0pk}+G_{0c(26a)k}H_{26a}+G_{0c(26c)k}H_{26c}.$$

Under the same assumption, the transfer function at each of the forty measurement positions in the desired low radiation area is:

$$Y_{1k}=G_{1pk}+G_{1c(26a)k}H_{26a}+G_{1c(26c)k}H_{26c}.$$

The transfer functions above include three terms because array 26 has three elements. As apparent from this description, the number of terms depends on the number of array elements. Thus, the corresponding transfer functions for array 27 are:

$$Y_{0k}=G_{0pk}+G_{0ck}H_{27a}$$

$$Y_{1k}=G_{1pk}+G_{1ck}H_{27a}.$$

Next, consider the following cost function:

$$J=\left[W_{eff}+\frac{W_{iso}}{N_{1pos}}\sum_{k}^{N_{1pos}}|Y_{1k}|^2\right]\left[\frac{1}{N_{0pos}}\sum_{k}^{N_{0pos}}(|Y_{0k}|^2+\varepsilon)^{-1}\right]$$

The cost function is defined for the transfer functions for array 27, although it should be understood from this description that a similar cost function can be defined for the array 26 transfer functions. The $\Sigma|Y_{1k}|^2$ term is the sum, over the low radiation measurement positions, of the squared magnitude transfer function at each position. This term is divided by the number of measurement positions to normalize the value. The term is multiplied by a weighting $W_{iso}$ that varies with the frequency range over which it is desired to control the directivity of the audio signal. In this example, $W_{iso}$ is a sixth order Butterworth bandpass filter. The pass band is the frequency band over which it is desired to optimize, typically from the driver resonance up to about 6 or 8 kHz. For frequencies beyond the range of about 125 Hz to about 4 kHz, $W_{iso}$ drops toward zero, and within the range, approaches one. A speaker efficiency function, $W_{eff}$, is a similarly frequency—dependent weighting. In this example, $W_{eff}$ is a sixth order Butterworth bandpass filter, centered around the driver resonance frequency and with a bandwidth of about 1.5 octaves. $W_{eff}$ prevents efficiency reduction from the optimization process at low frequencies.

The $\Sigma|Y_{0k}|^2$ term is the sum, over the ten high radiation measurement positions, of the squared magnitude transfer function at each position. Since this term can come close to zero, a weighting $\epsilon$ (e.g. 0.01) is added to make sure the reciprocal value is non-zero. The term is divided by the number of measurement positions (in this instance five) to normalize the value.

Accordingly, cost function J is comprised of a component corresponding to the normalized squared low radiation transfer functions, divided by the normalized squared high radiation transfer functions. In an ideal system, there would be no leaked audio signals in the desired low radiation directions, and J would be zero. Thus, J is an error function that is directly proportional to the level of leaked audio, and inversely proportional to the level of desired radiation, for a given array.

Next, the gradient of cost function J is calculated as follows:

$$\nabla_H J=2\frac{\partial J}{\partial H^*}=2\left[\frac{W_{iso}}{N_{1pos}}\sum_{k}^{N_{1pos}}G_{1ck}^{H}Y_{1k}\right]\left[\frac{1}{N_{0pos}}\sum_{k}^{N_{0pos}}(|Y_{0k}|^2+\varepsilon)^{-1}\right]-2\left[W_{eff}+\frac{W_{iso}}{N_{1pos}}\sum_{k}^{N_{1pos}}|Y_{1k}|^2\right]\left[\frac{1}{N_{0pos}}\sum_{k}^{N_{0pos}}G_{0ck}^{H}Y_{0k}(|Y_{0k}|^2+\varepsilon)^{-2}\right]$$

This equation results in a series of directional values for real and imaginary parts at each frequency position within the resolution of the transfer functions (e.g. every 5 Hz). To avoid over-fitting, a smoothing filter can be applied to the gradient. For an IIR implementation, a constant-quality-factor smoothing filter may be applied in the frequency domain to reduce the number of features on a per-octave basis. Although it should be understood that various suitable smoothing functions may be used, the gradient result c(k) may be smoothed according to the function:

$$c_s(k)=\sum_{i=0}^{n-1}c[(k-i)\bmod N]-w_{sm}(m,i),$$

where $c_s(k)$ is the smoothed gradient, k is the discrete frequency index ($0\le k\le N-1$) for the transfer function, and $W_{sm}$ (m,i) is a zero-phase spectral smoothing window function. The windowing function is a low pass filter with the sample index m corresponding to the cutoff frequency. The discrete variable m is a function of k, and m(k) can be considered a bandwidth function so that a fractional octave or other non-uniform frequency smoothing can be achieved. Smoothing functions should be understood in this art. See, for example, Scott G. Norcross, Gilbert A. Soulodre and Michel C. Lavoie, *Subjective Investigations of Inverse Filtering,* 52.10 Audio Engineering Society 1003, 1023 (2004). For a finite impulse response filter implementation, the frequency-domain smoothing can be implemented as a window in the time domain that restricts the filter length. It should be understood, however, that a smoothing function is not necessary.

If it is desired that the IIR filters be causal, the smoothed gradient series can then be transformed to the time domain (by an inverse discrete Fourier transform) and a time domain window (e.g. a boxcar window that applies 1 for positive time and 0 for negative time) applied. The result is transferred back to the frequency domain by a discrete Fourier transform. If causality is not forced, the array transfer function can be implemented by later applying an all-pass filter to all of the array elements.

In the presently described embodiment, the complex values of the Fourier transform are changed in the direction of the gradient by a step size that may be chosen experimentally to be as large as possible, yet small enough to allow stable adaptation. In the present example, where the transfer functions are normalized, a 0.1 step is used. These complex values are then used to define real and imaginary parts of a transfer function for an FIR filter for filter $H_{27a}$, the coefficients of which can be derived to implement the transfer functions as should be well understood in this art. Because the acoustic transfer functions $G_{0pk}$, $G_{0ck}$, $G_{1pk}$ and $G_{1ck}$ are known, the overall transfer functions $Y_{0k}$ and $Y_{1k}$ and cost function J can be recalculated. A new gradient is determined, resulting in further adjustments to $H_{27a}$ (or $H_{26a}$ and $H_{26c}$, where array 26 is optimized). This process is repeated until the cost function does not change or the degree of change falls within a predetermined non-zero threshold, or when the cost function itself falls below a predetermined threshold, or other suitable criteria as desired. In the present example, the optimization stops if, within twenty iterations, the change in isolation (e.g. the sum of all squared $Y_{1k}$) is less than 0.5 dB.

At the conclusion of this optimization step, the FIR filter coefficients are fitted to an IIR filter using an optimization tool as should be well understood. It should be understood, however, that the optimization may be performed on the complex values of the discrete Fourier transform to directly produce the IIR filter coefficients. The final set of coefficients for IIR filters $H_{26a}$ and $H_{26c}$ are stored in hard drive or flash memory. At startup of the system, control circuitry 84 selects the IIR filter coefficients and provides them to digital signal processor 96-4 which, in turn, loads the selected coefficients to filter $H_{27a}$.

This process is repeated for each of the high frequency arrays. For each array, acoustic transfer functions are calculated for multiple positions k in the desired high and low radiation areas, as indicated by the solid and dashed arrows in FIG. 2A, and the results are optimized to determine transfer functions that are effected by filters to apply to the secondary elements in each array to achieve desired performance. The discussion above is provided for purposes of explanation. It should be understood that the procedure outlined in this description can be modified. For instance, rather than taking all microphone measurements for an array, and then taking all microphone measurements for each other array in sequence, the microphone can be placed at an expected ear position, and then each element of each array driven in sequence to determine the measurement for all array elements for that point k in space. The microphone is then moved to the next position, and the process repeated. Moreover, it should be understood that the optimization procedure described above, including the cost and gradient functions, represent one optimization method but that other methods could be used. Thus, the procedure described herein is presented for purposes of explanation only.

Figure 3F:
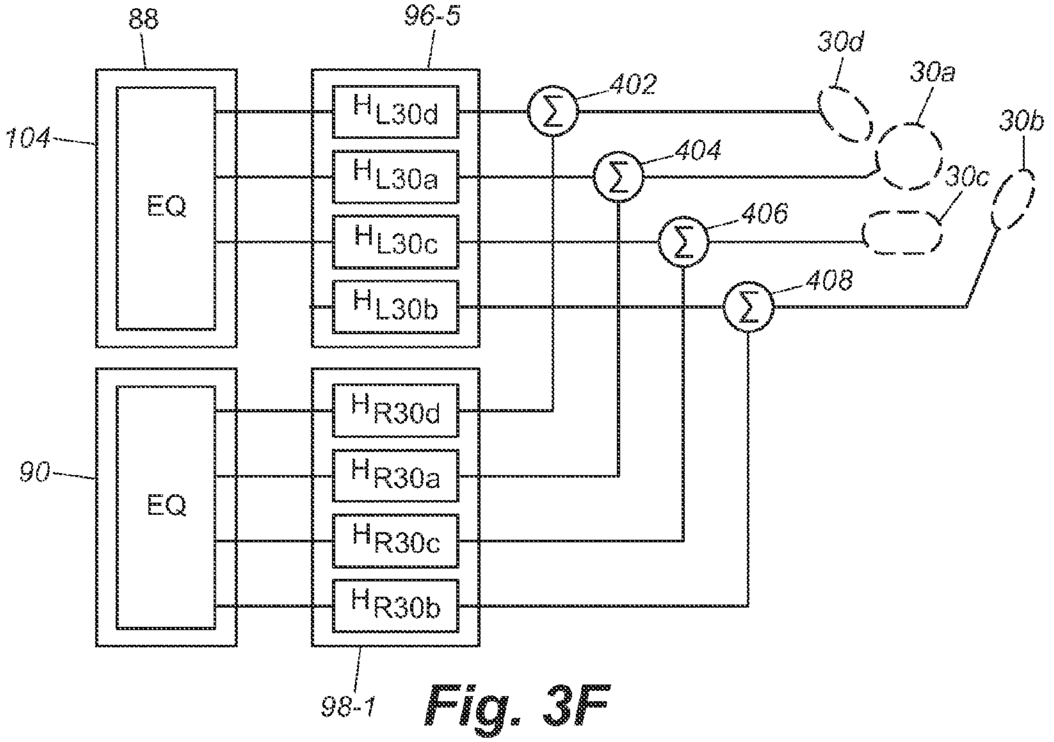

As indicated above, center arrays 30, 48 and 44 are each used to apply audio simultaneously to two seat positions. This does not, however, affect the procedure for determining the filter transfer functions for the array elements. Referring to FIG. 3F, for example, each of array elements 30*a*, 30*b*, 30*c* and 30*d* is driven by two signal inputs that are combined at respective summing junctions 404, 408, 406 and 402. Considering first the signals of array 30 with respect to seat position 18, element 30*d* is the primary element, and elements 30*a*, 30*b* and 30*c* are secondary elements. Thus, to determine the transfer functions $H_{L30a}$, $H_{L30c}$ and $H_{L30b}$, the IIR filter $H_{L30d}$ is set to the identity function, and all other speaker elements in all arrays are disabled. The microphone is sequentially placed at a plurality of positions (e.g. five) within an area in which the right ear of occupant 58 is expected, and element 30*d* is driven by the same audio signal, at the same volume, when the microphone is at each of the five positions. The $G_{0pk}$ acoustic transfer function is calculated at each position. The microphone is then moved to ten positions within each of the three desired low radiation areas indicated by the dashed lines from the left side of array 30 in FIG. 2A. At each position, a low radiation acoustic function $G_{1pk}$ is determined.

The process repeats for the secondary elements 30*a*, 30*b* and 30*c*, setting each of the filter transfer functions $HL_{30a}$, $HL_{30b}$ and $HL_{30c}$ to the identity function in turn. After measuring all 140 acoustic transfer functions, the gradient of the resulting cost functions is calculated as described above, and filter transfer functions $H_{L30a}$, $H_{L30b}$ and $H_{L30c}$ are updated accordingly. The overall transfer and cost functions are recalculated, and the gradient is recalculated. The process repeats until the change in isolation for the array optimization falls within a predetermined threshold, 5 dB.

With respect to seat position 20, element 30*b* is the primary element. Thus, to determine filter transfer functions $H_{R30a}$, $H_{R30c}$ and $H_{R30d}$ for the secondary elements, transfer function $H_{R30b}$ is initialized to the identity function, and all other elements, in all arrays, are disabled. A microphone is sequentially placed at a plurality of positions (e.g. five) in which the left ear of occupant 70 is expected, and element 30*b* is driven by the same audio signal, at the same volume, when the microphone is at each of the five positions. The acoustic transfer function $G_{0pk}$ is measured for each microphone position. Measurements are taken at ten microphone positions at each of the low radiation areas indicated by the dashed lines from the right side of array 30 in FIG. 2A. From these measurements, the low radiation acoustic transfer functions $G_{1pk}$ are derived. The process is repeated for each of the secondary elements 30*a*, 30*c* and 30*d*. From the resulting 140 transfer functions, the gradient of the resulting cost function is determined and filter transfer functions $H_{R30a}$, $H_{R30c}$ and $H_{R30d}$ updated accordingly. The overall transfer and cost functions are recalculated, and the gradient is recalculated. The process repeats until the change in isolation for the array optimization falls within a predetermined threshold.

Figure 3G:
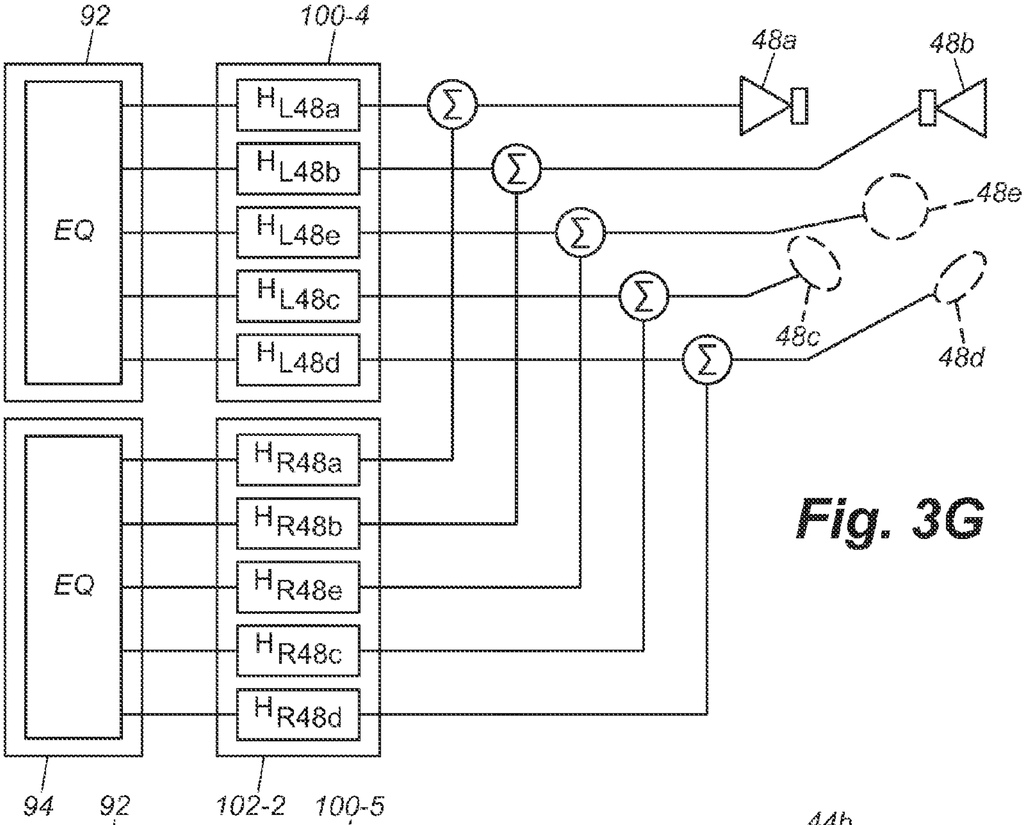
Figure 3H:
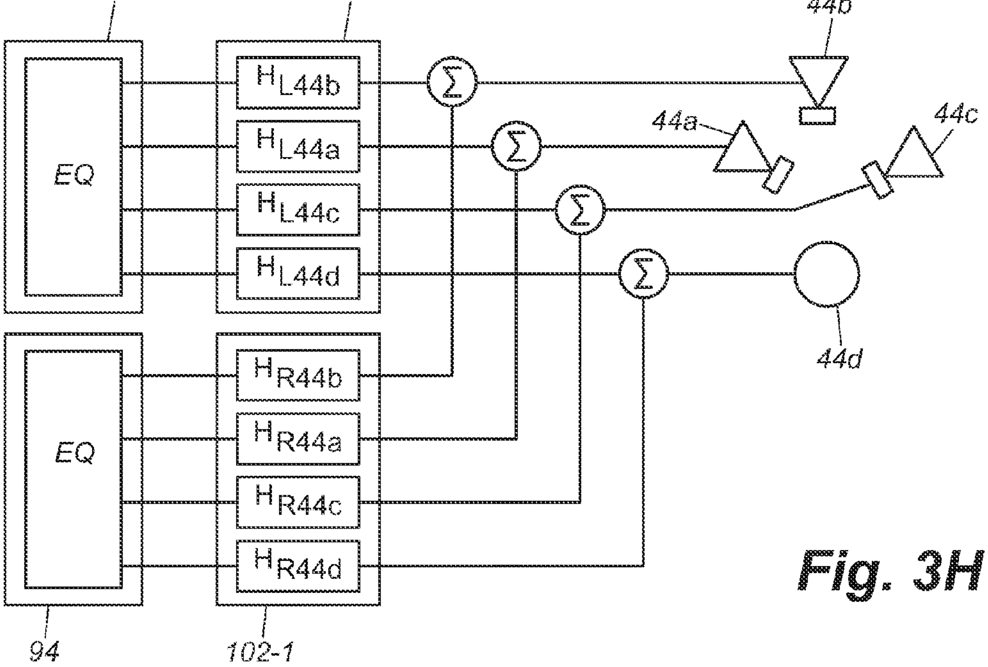

A similar procedure is applied to center arrays 48 and 44, as indicated in FIGS. 3G and 3H.

As described above, FIG. 2A indicates the high and low radiation positions at which the microphone measurements are taken in the above-described optimization procedure, for each of the other high frequency arrays. Beginning at array 28, a high radiation direction is radiated to the left ear of occupant 58, while low radiation directions are radiated to each of the left and right ears of the expected head positions of occupants 70, 72 and 74 (although the low radiation line to each seat occupant 70, 72 and 74 is shown as a single line, the single line represents low radiation positions at each of the two ear positions for a given seat occupant). The array also radiates a low radiation direction to a near reflection surface, i.e. the driver door window, although, as indicated above, it is contemplated that near reflective surfaces may not be considered in the optimization. FIG. 2A presents a two dimensional view. It should be understood, however, that because array 28 is mounted in the roof, the high radiation direction to the left ear of occupant 58 has a greater downward angle than the low radiation direction toward occupant 74. Thus, there is a greater divergence in those directions than is directly illustrated in FIG. 2A.

Regarding array 27, there is a high radiation position at the right ear of occupant 58 and low positions at the left and right ears of the expected head positions of occupants 70, 72 and 74.

With respect to the audio directed to seat position 18 by array 30, there is a high radiation position at the right ear of occupant 58 and low radiation positions at the left and right ears of the expected head positions of occupants 70, 72 and 74. With respect to the audio directed to seat position 20 by array 30, there is a high radiation position at the left ear of occupant 70 and low radiation positions at the left and right ears of the expected head positions of occupants 58, 72 and 74.

Regarding array 34, there is a high radiation position at the left ear of occupant 70 and low radiation positions to the left and right ears of the expected head positions of occupants 58, 72 and 74.

Regarding, array 38, there is a high radiation position at the right ear of occupant 70 and low radiation positions at the left and right ears of the expected head positions of occupants 58, 72 and 74, as well as (optionally) a near reflection vehicle surface—the front passenger side door window.

Regarding array 36, there is a high radiation position at the right ear of occupant 70 and low radiation positions at the left and right ears of the expected head positions of occupant 58, 72 and 74, as well as (optionally) a near reflection vehicle surface—the front passenger door side window.

Regarding array 46, there is a high radiation position at the left ear of occupant 72 and low radiation positions at the left and right ears of the expected head positions of occupants 58, 70 and 74, as well as (optionally) a near reflection vehicle surface—the rear driver's side door window.

Regarding array 42, there is a high position at the left ear of occupant 72 and low positions at the left and right ears of the expected head positions of occupants 58, 70 and 74, as well as (optionally) a near reflection vehicle surface—the rear driver's side door window and rear windshield.

With respect to audio directed to seat position 22 from array 48, there is a high radiation position at the right ear of occupant 72 and low positions at the left and right ears of the expected head positions of occupants 58, 70 and 74.

With regard to audio directed to seat position 24 from array 48, there is a high radiation positions at the left ear of occupant 74 and low radiation positions at the left and right ears of the expected head positions of occupants 58, 70 and 72.

With regard to audio directed to seat position 22 from array 44, there is a high radiation position at the right ear of occupant 72 and low radiation positions at the left and right ears of the expected head positions of occupants 58, 70 and 74. With respect to audio directed to seat position 24 by array 44, there is a high radiation position at the left ear of occupant 74 and low radiation positions at the left and right ears of the expected head positions of occupants 58, 70 and 72.

With regard to array 52, there is a high radiation position at the right ear of occupant 74 and low radiation positions at the left and right ears of the expected head positions of occupants 58, 70 and 72 and (optionally) to near reflection vehicle surfaces—the rear passenger door window and rear windshield.

Regarding array 54, there is a high radiation position at the right ear of occupant 74 and low radiation positions at the left and right ears of the expected head positions of occupants 58, 70 and 72, as well as (optionally) to a near reflection vehicle surface—the rear passenger side door window.

If the iterative optimization processes for all arrays in the system proceed until the magnitude change in the cost function or isolation (e.g. the sum of the squared $Y_{1k}$, which is a term of the cost function) in each array optimization stops or falls below the predetermined threshold, then the entire array system meets the desired performance criteria. If, however, for any one or more of the arrays, the secondary element transfer functions do not result in a cost function or isolation falling within the desired threshold, the position and/or orientation of the array can be changed, and/or the orientation of one or more elements within the array can be changed, and/or an acoustic element may be added to the array, and the optimization process repeated for the affected array. The procedure is then resumed until all arrays fall within the desired criteria.

The preceding discussion presumes that the audio to each seat position should be isolated at the seat position from all three other seat positions. This may be desirable, for example, if all four seat positions are occupied and each seat position listens to different audio. Consider, however, the condition in which only seat positions 18 and 20 are occupied and where the occupants of the two seat positions are listening to different audio. Because the audio to the seat occupants is different, it is desirable to isolate seat position 18 and seat position 20 with respect to each other, but there is no need to isolate either seat position 18 or 20 with respect to either of seat positions 22 and 24. In determining the IIR filter transfer functions for the secondary acoustic elements in the arrays that generate audio for seat position 18, for example, the low radiation position measurements corresponding to the respective head positions of seat occupants 72 and 74 may be omitted from the optimization. Thus, in defining the filters for array 26, the optimization procedure eliminates measurements taken, and therefore transfer functions calculated for, the low radiation areas indicated by arrows 263 and 264. This reduces the number of transfer functions that are considered in the cost function. Because there are fewer constraints on the optimization, there is a greater likelihood the optimization will reach a minimum point and, in general, provide better isolation performance. The optimizations for the filter functions for the remaining arrays at seat positions 18 and 20 likewise omit transfer functions for low radiation directions corresponding to seat positions 22 and 24.

Similarly, assume that all four seats are occupied, but that occupants at seat positions 18, 22 and 24 are listening to the same audio, while the occupant at seat position 20 listens to different audio. The optimization procedure for seat position 18 is the same as the previous example. Because the occupants of seat positions 18, 22 and 24 listen to the same audio, there may be no concern about audio leaking from the arrays of any one of those three seat positions to any of the other two. Thus, the optimization of any of these three seat positions omits transfer functions for low radiation positions at the other two. Seat position 20, however, is isolated with respect to all three other seat positions. That is, its optimization considers transfer functions of all three other seat positions as desired low radiation areas.

In summary, given the high and low radiation areas illustrated in FIG. 2A, the optimization procedure for a given array for a given seat position considers acoustic transfer functions for expected head positions of another seat position only if the other seat position is (a) occupied and (b) receiving audio different from the given seat position. If the other seat position is occupied, but its audio is disabled, the seat position is considered during the optimization process, in order to reduce the noise radiated to the seat position. In other words, disabled audio is considered common to all other audio. If near reflective surfaces are considered in the optimization, they are considered regardless of seat occupancy or audio commonality among seat positions. That is, even if all four seat positions are listening to the same audio, each position is isolated to any near reflective surfaces at the seat position.

In another embodiment, the commonality of audio among seat positions is not considered in selecting optimization parameters. That is, seat positions are isolated with respect to other seat positions that are occupied, regardless whether the seat positions receive the same or different audio. Isolation among such seat positions can reduce time-delay effects of the same audio between the seat positions and can facilitate in-vehicle conferencing, as discussed below. Thus, in this embodiment, the optimization procedure for a given array at a given seat position considers acoustic transfer functions for expected head positions of another seat position (i.e. considers the other seat position as a low radiation position) only if the other seat position is occupied.

Still further, the system may define predetermined zones between which audio is to be isolated. For example, the system may allow the driver to select (through manual input 86 to control circuit 84, in FIGS. 3A and 3D) a zone mode in which front seat positions 18 and 20 are not isolated with respect to each other but are isolated with respect to rear seat positions 22 and 24. Conversely, rear seat positions 22 and 24 are not isolated with respect to each other but are isolated with respect to seat positions 18 and 20. Thus, the optimization procedure for a given array for given seat position considers acoustic transfer functions for expected head positions of another seat position only if the other seat position is outside the given seat position's predefined zone and, optionally, if the other seat position is occupied. While front/back zones are described, zones can comprise any configuration of seat position groups as desired. Where a system operates with multiple zone configurations, a desired zone configuration can be selected by a user in the vehicle through manual input 86 to control circuit 89.

Accordingly, it will be understood that the criteria for determining which seat positions are to be isolated from a given seat position can vary depending on the desired use of the system. Moreover, in the presently described embodiments, if audio is activated at a given seat position, that seat position is isolated with respect to other seat positions according to such criteria, regardless whether the seat position itself is occupied.

Because there are a finite number of seat positions in the vehicle (i.e. four, in the example shown in FIGS. 2A and 2B), there are a finite number of possible optimization parameter combinations. Each possible combination is defined by the occupancy states of the four seat positions and/or, optionally, the commonality of audio among the seat positions or the seat positions' inclusion in seat position zones. Those parameters, as applicable and along with applicable near reflective surfaces, if considered, define the high and low radiation positions that are considered in the optimizations for the acoustic elements in the arrays at the four positions. The optimization described above is executed for each possible combination of seat position occupancy and audio commonality, thereby generating a set of filter transfer functions for the secondary elements in all arrays in the vehicle system for each occupancy/commonality/zone combination. The sets of transfer functions are stored in memory in association with an identifier corresponding to the unique combination.

Control circuitry 84 (FIG. 3B) determines which combination is present in a given instance. The vehicle seat at each seat position has a sensor that changes state depending upon whether a person is seated at the position. Pressure sensors are presently used in automobile front seats to detect occupancy of the seats and to activate or de-activate front seat airbags in response to the sensor, and such pressure sensors may also be used to detect seat occupancy for determining which signal processing combination is applicable. The output of these sensors is directed to control circuitry 84, which thereby determines seat occupancy for the front seats. A similar set of pressure sensors disposed in the rear seats outputs signals to control circuitry 84 for the same purpose. Thus, and because each seat position occupant selects audio through control circuitry 84, the control circuitry has, at all times, information that defines seat occupancy of all four seats and the commonality of audio among the four seat positions. At startup, control circuitry 84 determines the particular combination in existence at that time, selects from memory the set of IIR filter coefficients for the vehicle array system that correspond to the combination, and loads the filter coefficients in the respective array circuits. Control circuitry 84 periodically checks the status of the seat sensors and the seat audio selections. If the status of these inputs changes, so as to change the optimization combination, control circuitry 84 selects the filter coefficients corresponding to the new combination, and updates the IIR filters accordingly. It should be understood that while pressure sensors are described herein, this is for purposes of example only and that other devices, for example infrared, ultrasonic or radio frequency detectors or mechanical switches, for detecting seat occupancy may be used.

Figure 4B:
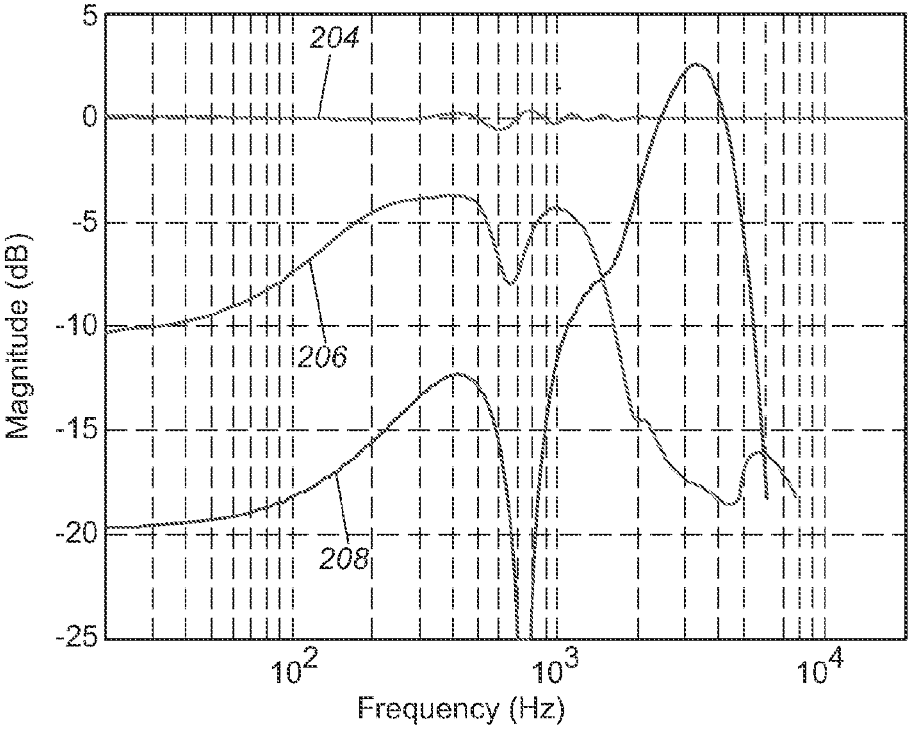
FIG. 4B is a plot of gain transfer functions for speaker elements of the speaker array described with respect to FIG. 4A.
Figure 4C:
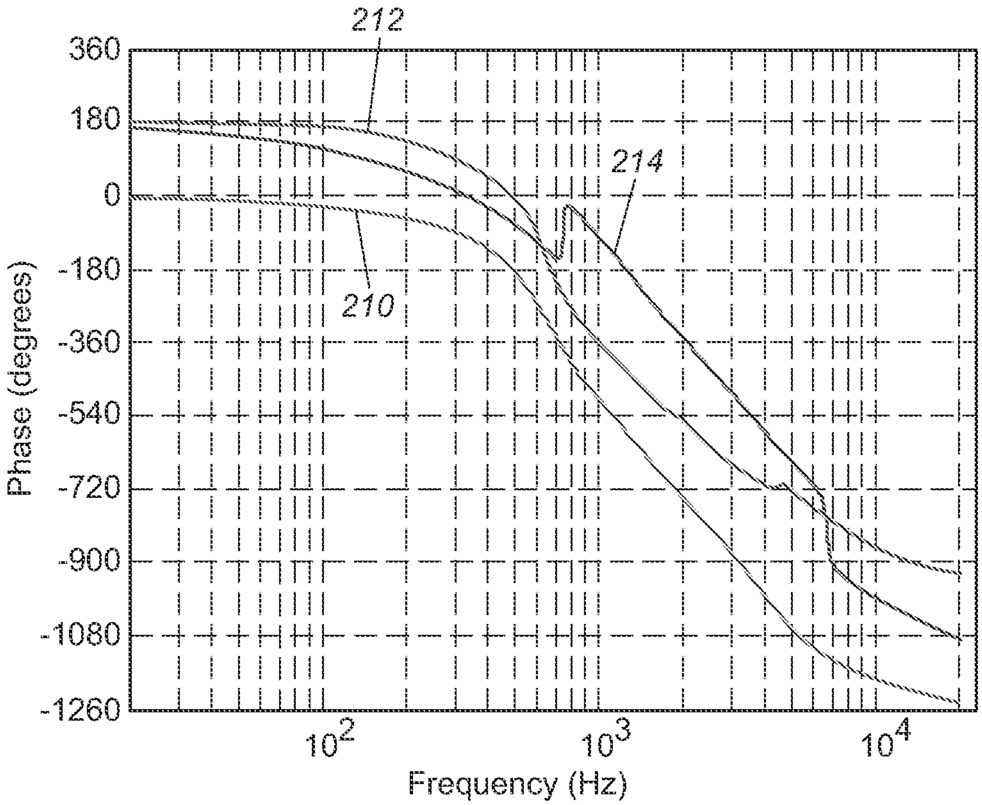
FIG. 4C is a plot of phase transfer functions for speaker elements of the speaker array described with respect to FIG. 4A.

FIGS. 4B and 4C graphically illustrate the transfer functions for array 36 (FIG. 2B). Referring to FIG. 4B, line 204 represents the magnitude frequency response applied to the incoming audio signal (in dB) for speaker element 36*b* by its IIR filter. Line 206 represents the magnitude frequency response applied to speaker element 36*a*, and line 208 represents the magnitude frequency response applied to speaker element 36*c*. FIG. 4C illustrates the phase response each IIR filter applies to the incoming audio signal. Line 210 represents the phase response applied to the signal for element 36*b*, as a function of frequency. Line 212 illustrates the phase shift applied to element 36*a*, while line 214 shows the phase shift applied to element 36*c*. A high pass filter with a break point frequency of 185 Hz may be applied to the speaker array externally of the IIR filters. As a result of the optimization process, the IIR filter transfer functions effectively apply a low pass filter at about 4 kHz.

As those skilled in the art should understand, an audio array can generally be operated efficiently in the far field (e.g. at distances from the array greater than about 10× the maximum array dimension) as a directional array at frequencies above bass levels and below a frequency at which the corresponding wavelength is one-half of the maximum array dimension. In general, the maximum frequency at which the arrays are driven in directional mode is within about 1 kHz to 2 kHz, but in the presently described embodiments, directional performance of a given array is defined by whether the array can satisfy the above-described optimization procedure, not whether the array can radiate a given directivity shape. Thus, for example, the range over which multiple elements in the arrays are operated with destructive interference depends on whether an array can meet the optimization criteria, which in turn depends on the number of elements in the array, the size of the elements, the spacing of the elements, the high and low radiation parameters, and the array's ambient environment, not upon a direct correlation to the spacing between elements in the array. With regard to array 38 as described in FIG. 4, the secondary elements contribute to the array's directional performance effectively up to about 4 kHz.

Above this frequency range, a single loudspeaker element is typically sufficiently directive in and of itself that the single element directs desired acoustic radiation to the occupant of the desired seat position without undesired acoustic leakage to the other seat positions. Because the primary element system filters are held to identity in the optimization process, only the primary speaker elements are activated above this range.

The present discussion has to this point focused on the high frequency speaker arrays (i.e. arrays 26, 27, 28, 34, 36, 38, 42, 46, 52, 54, 44, 48 and 30). For frequencies below about 180 Hz, each seat position is provided with a two-element bass array 32, 40, 50 or 56 that radiates into the vehicle cabin. In the presently-described embodiment, the elements in each bass array are separated from each other by a distance of about 40 cm, significantly greater than the separation among elements in the high frequency arrays. The elements are disposed, for example, in the seat back, so that the listener is closer, and in one embodiment as close as possible, to one element than to the other. In the illustrated embodiment, the seat occupant is a distance (e.g. about 10 cm) from the close element that is less than the distance (e.g. about 40 cm) between the two bass elements.

Accordingly, in the presently described embodiment, two bass elements (32*a*/32*b*, 40*a*/40*b*, 50*a*/50*b* and 56*a*/56*b*) are disposed in the seat back at each respective seat position so that one bass speaker is closer to the seat position occupant than the other, which is greater than 40 cm from the listener. The cone axes of the two bass speaker array elements are coincident or parallel with each other (although this orientation is not necessary), and the speakers face in opposite directions. In one embodiment, the speaker element closer to the seat occupant faces the occupant. This arrangement is not necessary, however, and in another embodiment, the elements face the same direction. The bass audio signals from each of the two speakers of the two-element array are out of phase with respect to each other by an amount determined by the optimization procedure described below. Considering bass array 32, for example, at points relatively far from the array, for example at seat positions 20, 22 and 24, audio signals from elements 32*a* and 32*b* cancel, thus reducing their audibility at those seat positions. However, because element 32*b* is closer than element 32*a* to occupant 58, the audio signals from element 32*b* are stronger at the expected head position of occupant 58 than are those radiated from element 32*a*. Thus, at the expected head position of occupant 58, radiation from element 32*a* does not significantly cancel audio signals from element 32*b*, and occupant 58 can hear those signals.

As described above, the two bass elements may be considered a pair of point sources separated by a distance. The pressure at an observation point is the combination of the pressure waves from the two sources. At observation points at distances from the device large relative to distance between the elements, the distance from each of the two sources to the observation point is relatively equal, and the magnitudes of the pressure waves from the two radiation points are approximately equal. Generally, radiation from the two sources in the far field will be equal. Given that the magnitudes of the acoustic energy from the two radiation points are approximately equal, the manner in which the contributions from the two radiation points combine is determined principally by the relative phase of the pressure waves at the observation point. If it is assumed that the signals are 180° out of phase, they tend to cancel in the far field. At points that are significantly closer to one of the two radiation points, however, the magnitude of the pressure waves from the two radiation points are not equal, and the sound pressure level at those points is determined principally by the sound pressure level from the closer radiation point. In the presently described embodiment, two spaced-apart bass elements are used, but it should be understood that more than two elements could be used and that, in general, various bass configurations can be employed.

Figure 3I:
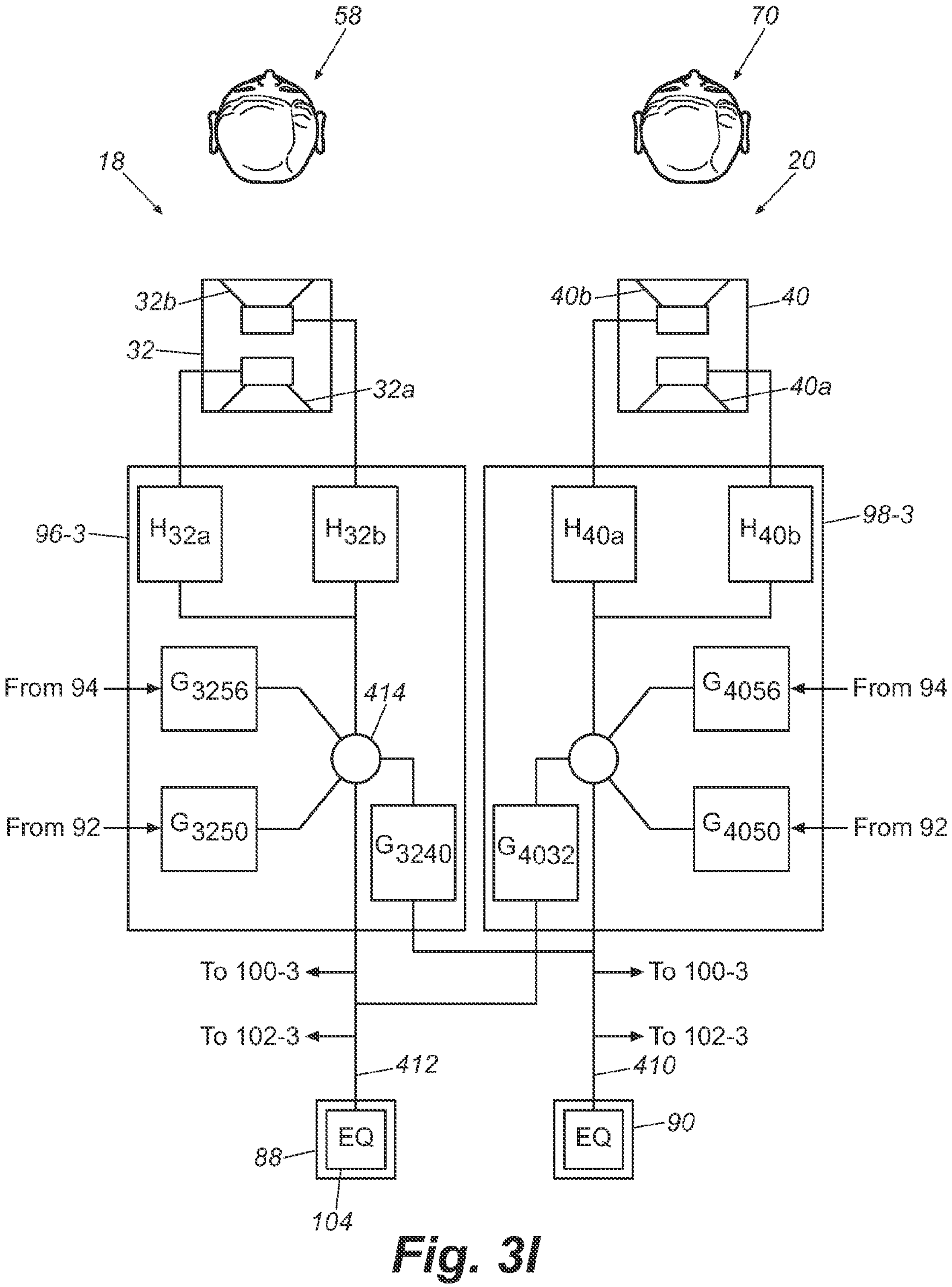

While in one embodiment the bass array elements are driven 180° out of phase with respect to each other, isolation may be enhanced through an optimization procedure similar to the procedure discussed above with respect to the high frequency arrays. Referring to FIGS. 3A and 3I, with respect to seat position 18 and bass array 32, digital signal processor 96-3 defines respective filter transfer functions $H_{32a}$ and $H_{32b}$, each of which are defined as coefficients to an IIR filter effected by the digital signal processor. Element 32*b*, being the closer of the two elements to seat occupant 58, is the primary element, whereas element 32*a* is the secondary element.

To begin the optimization, transfer function $H_{32b}$ is set to the identity function, and all other speaker elements (in array 32 and all other arrays) are disabled. A microphone is sequentially placed at a plurality of positions (e.g. 10) within an area in which the left and right ears (five of the ten positions per ear) of occupant 58 are expected, and element 32*b* is driven by the same audio signal, at the same volume, when the microphone is at each of the ten positions. At each position, the microphone receives the radiated signal, and the acoustic transfer function $G_{0pk}$ is measured for each microphone measurement.

The microphone is then sequentially placed at a plurality of positions (e.g. 10) within the area in which the head of occupant 70 is expected (five measurements for expected positions of each ear), and element 32*b* is driven by the same audio signal, at the same volume, as in the measurements for occupant 58. At each position, the microphone receives the radiated signal, and the acoustic function, $G_{1pk}$, is measured for each microphone measurement.

The microphone is then sequentially placed at a plurality of positions (e.g. 10) within an area in which the head of occupant 72 (FIG. 2A) is expected (five measurements for expected positions of each ear), and element 32*b* is driven by the same audio signal, at the same volume, as in the measurements for occupant 58. At each position, the microphone receives the radiated signal, and the acoustic transfer function $G_{1pk}$ is determined for each measurement.

The microphone is then sequentially placed at a plurality of positions (e.g. 10) within an area in which the head of occupant 74 (FIG. 2A) is expected (five measurements for expected positions of each ear), and element 32*b* is driven by the same audio signal, at the same volume, as in the measurements for occupant 58. At each position, the microphone receives the radiated signal, and the acoustic transfer function, $G_{1pk}$, for each microphone measurement is measured.

Accordingly, ten acoustic transfer functions $G_{0pk}$ and thirty acoustic transfer functions $G_{1pk}$ are calculated.

Next, transfer function $H_{32a}$ is set to the identity function, and all other speaker elements and all other arrays are disabled. The microphone is sequentially placed at the same ten positions within the area in which the ears of occupant 58 are expected, and element 32*a* is driven by the same audio signal, at the same volume, as during the measurements of element 32*b*, when the microphone is at each of the ten positions. Ten acoustic transfer functions $G_{0ck}$ are calculated.

The procedure for determining acoustic transfer functions at the desired low radiation positions described above for element 32*b* is repeated for element 32*a*, at the same microphone positions, resulting in thirty acoustic transfer functions $G_{1ck}$ for element 32*a*.

This procedure results in eighty acoustic transfer functions for the overall array with respect to forty measurement positions. Considering each of the ten measurement positions in the desired high radiation area, the transfer function at each position k is:

$$Y_{0k}=G_{0pk}H_{32b}+G_{0ck}H_{32a},$$

Where $G_{0ck}H_{32a}$ refers to the acoustic transfer function measured at the particular position k for element 32*a*, multiplied by the IIR filter transfer function $H_{32a}$. The transfer function $H_{32b}$ of the primary element 32*b* is, again, held to the identity function. Thus, under this assumption, the transfer function at point k becomes:

$$Y_{0k}=G_{0pk}+G_{0ck}H_{32b}.$$

Under the same assumption, the transfer function at each of the thirty measurement positions in the desired low radiation areas is:

$$Y_{1k}=G_{1pk}+G_{1ck}H_{32a}.$$

A cost function J is defined similarly to the cost function described above with respect to the high frequency arrays. The gradient of the cost function is calculated in the same manner as discussed above, resulting in a series of vectors for real and imaginary parts at each frequency position within the resolution of the transfer functions (e.g. every 5 Hz). To avoid over-fitting, the same smoothing filter as discussed above can be applied to the gradient. If it is desired that the IIR filters be causal, the smoothed gradient series can then be transformed to the time domain by an inverse discrete Fourier transform, and the same time domain window applied as discussed above. The result is transformed back to the frequency domain. The complex values of the Fourier transform are changed in the direction of the gradient by the same step size as described above, and these complex values are used to define real and imaginary parts of a transfer function for an FIR filter for filter $H_{32a}$ at each frequency step. The overall transfer and cost functions are recalculated, and a new gradient is determined, resulting in further adjustments to $H_{32b}$. This process is repeated until the cost function does not change or its change (or the change in isolation) falls within a predetermined threshold. The FIR filter coefficients are then fitted to an IIR filter using an optimization tool as should be well understood, and the filter is stored.

Figure 3J:
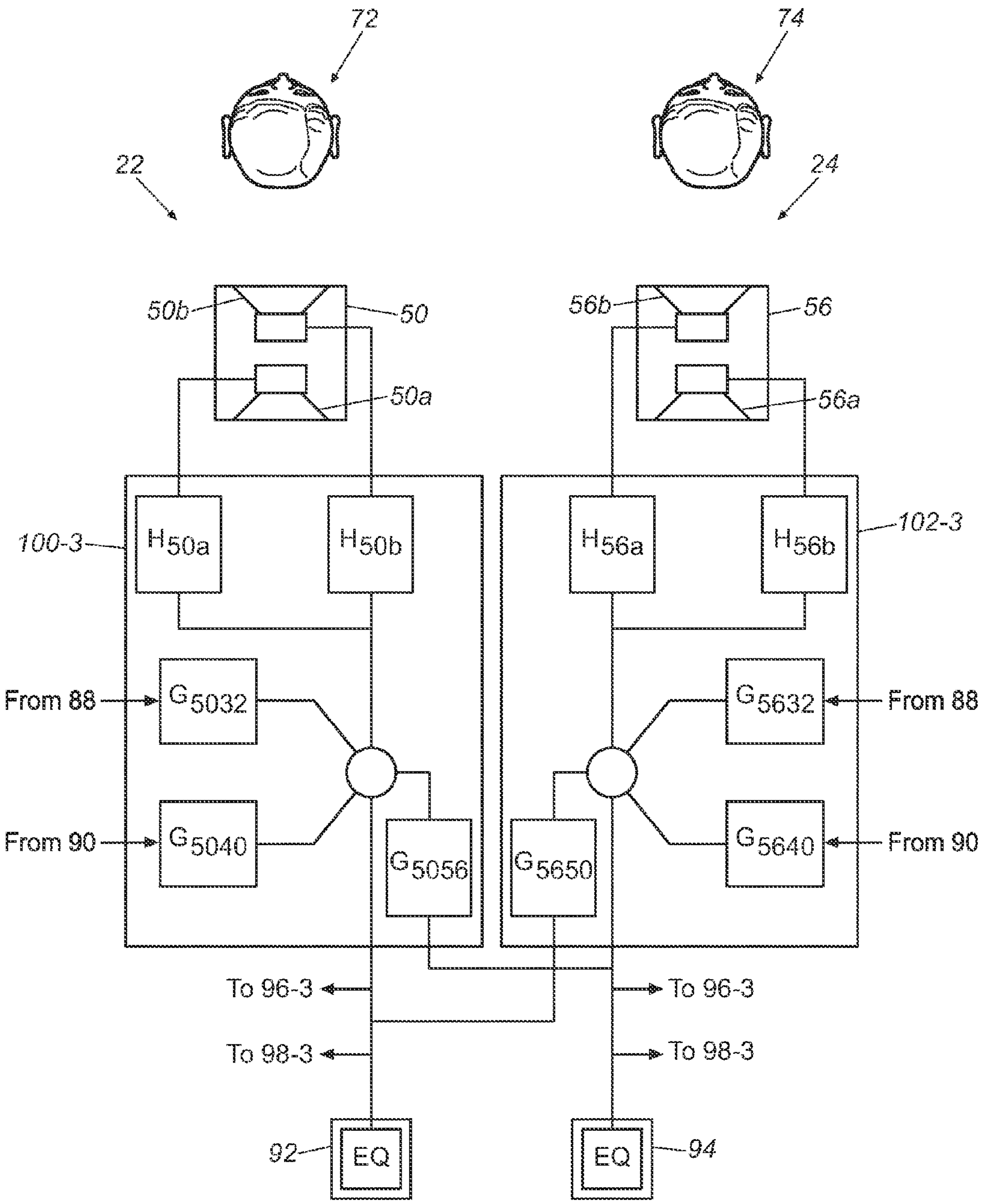

Referring also to FIG. 3J, this process is repeated to determine the transfer functions $H_{40a}$, $H_{40b}$, $H_{50a}$, $H_{50b}$, $H_{56a}$ and $H_{56b}$ corresponding to bass elements 40*a*, 40*b*, 50*a*, 50*b*, 56*a* and 56*b*, respectively. As in the optimization procedure for array 32, transfer functions $H_{40b}$, $H_{50b}$ and $H_{56b}$ for primary elements 40*b*, 50*b* and 56*b* are maintained at the identity function, and the optimization procedure is performed for each array to determine the coefficients for the IIR filter to effect transfer functions $H_{40a}$, $H_{50a}$ and $H_{56a}$. The high radiation positions for array 40 are the expected left and right ear positions of occupant 70 of seat position 20, while the low radiation positions are the expected left and right ear positions of occupant 58 of seat position 18, occupant 72 of seat position 22 and occupant 74 of seat position 24. The desired high radiation area for array 50 is comprised of the expected positions of the left and right ears of occupant 72 of seat position 22, while the low radiation positions are the expected left and right ear positions of occupant 58 of seat position 18, occupant 70 of seat position 20, and occupant 74 of seat position 24. The high radiation areas for array 56 are the expected positions of the left and right ears of occupant 74 of seat position 24, while the low radiation positions are the expected left and right ear positions of occupant 58 of seat position 18, occupant 70 of seat position 20, and occupant 72 of seat position 22.

Even with the inherent isolation resulting from far field cancellation of the bass element arrays, based on the optimization of the transfer functions, some level of bass audio can be expected to leak from each bass array to each of the other three seat positions. Because the leaked audio occurs at bass frequencies, the magnitude and phase of leaked audio, considered at any given seat position, from any other seat position can be expected not to vary rapidly for variations in the head position of the occupant at that seat position. Consider, for example, occupant 70 at seat position 20. If some degree of audio from bass array 32 leaks to seat position 20, the magnitude and phase of that leaked audio can be expected not to vary rapidly within the normally expected range of head movement of occupant 70. In one embodiment of the system disclosed herein, this characteristic is used to further enhance isolation of the bass array audio to the respective seat positions.

Consider bass array 40, for example with respect to bass audio leaked from bass array 40 to seat position 18. As indicated in FIG. 3I, input signal 410 that drives bass array 40 is also directed to bass array 32, through a sum junction 414. Assume that only input signal 410 is active, i.e., that all other input signals, to all high frequency arrays and all other bass arrays, are zero. In the above-described optimization of the bass array elements, the transfer functions $H_{32a}$, $H_{32b}$, $H_{40a}$ and $H_{40b}$ were defined. That is, the signal processing between each of the bass array elements 32*a*/32*b* and 40*a*/40*b* and the respective input signals that commonly drive each pair of bass elements is fixed. Thus, for purposes of this secondary optimization, each of arrays 32 and 40 can be considered as a single element. The secondary optimization considers arrays 40 and 32 as if they were elements of a common array to which signal 410 is the only input signal, where the purpose is to direct audio to the expected position of seat occupant 70 of seat position 20 and reduce audio to the expected head position of occupant 58 of seat position 18. Accordingly, array 40 can be considered the primary "element," whereas array 32 is the secondary "element."

In terms of this secondary optimization, the overall transfer function between signal 410 and a point k at the expected head position of occupant 70 at seat position 20 is termed $Y_{0k(2)}$, where "0" indicates that the position k is within the area to which it is desired to radiate audio energy. The first part of overall transfer function $Y_{0k(2)}$ is the transfer function between signal 410 and the audio radiated to point k through array 40. Since the transfer function between signal 410 and elements 40a and 40b is fixed (again, the first optimization determined $H_{40a}$ and $H_{40b}$), this transfer function is fixed and can be considered to be an acoustic transfer function, $G_{0pk(2)}$. $G_{0pk(2)}$ is the final acoustic transfer function between signal 410 and position k, through elements 40a and 40b, determined at the result of the first optimization for array 40, or $G_{0pk}H_{40b}+G_{0ck}H_{40a}$. Since $H_{40b}$ is the identity function, acoustic transfer function $G_{0pk(2)}$ can be described:

$G_{0pk(2)}=G_{0pk}+G_{0ck}H_{40a}$, generated by the final optimization of bass array elements 40.

The second part of overall transfer function $Y_{0k(2)}$ is the transfer function between signal 410 and the audio radiated to the same point k through array 32. If filter $G_{3240}$ is the identity function, then because the transfer function between signal 410 and elements 32a and 32b is fixed (again, the first optimization determined $H_{32a}$ and $H_{32b}$), this transfer function is fixed and can be considered to be an acoustic transfer function, $G_{0ck(2)}$. $G_{0ck(2)}$ is the final acoustic transfer function between signal 410 and position k, through elements 32a and 32b, determined at the result of the first optimization for array 32, or $G_{1pk}H_{32b}+G_{1ck}H_{32a}$. Since $H_{32b}$ is the identity function, acoustic transfer function $G_{0ck(2)}$ can be described:

$G_{0ck(2)}=G_{1pk}+G_{1ck}H_{32a}$, generated by the final optimization of bass array elements 32.

An all pass function may be applied to $H_{32a}$ and $H_{32b}$, and all other bass element transfer functions, to ensure causality.

Of course, the radiated signal from array 32 to seat position 20 contributed by input signal 410 is affected by system transfer function $G_{3240}$, and so the second acoustic transfer function $G_{0ck(2)}$ is modified by the system transfer function. Accordingly, the overall transfer function $Y_{0k(2)}$ for a point k at the expected head position of occupant 70 is:

$$Y_{0k(2)}=G_{0pk(2)}+G_{3240}G_{0ck(2)}.$$

The overall transfer function between signal 410 and a point k at the expected head position of occupant 58 at seat position 18 is termed $Y_{1k(2)}$, where "1" indicates that the position k is within the area to which it is desired to reduce radiation of audio energy. The first part of overall transfer function $Y_{1k(2)}$ is the transfer function between signal 410 and the audio radiated to point k through array 40. Since the transfer function between signal 410 and elements 40a and 40b is fixed, this transfer function is fixed and can be considered to be an acoustic transfer function, $G_{1pk(2)}$. $G_{1pk(2)}$ is the final acoustic transfer function between signal 410 and position k, through elements 40a and 40b, determined at the result of the first optimization for array 40, or $G_{1pk}H_{40b}+G_{1ck}H_{40a}$. Since $H_{40b}$ is the identity function, acoustic transfer function $G_{0pk(2)}$ can be described:

$G_{1pk(2)}=G_{1pk}+G_{1ck}H_{40a}$, generated by the final optimization of bass array elements 40.

The second part of overall transfer function $Y_{1k(2)}$ is the transfer function between signal 410 and the audio radiated to the same point k through array 32. If filter $G_{3240}$ is the identity function, then because the transfer function between signal 410 and elements 32a and 32b is fixed, this transfer function is fixed and can be considered to be an acoustic transfer function, $G_{1ck(2)}$. $G_{1ck(2)}$ is the final acoustic transfer function between signal 410 and position k, through elements 32a and 32b, determined at the result of the first optimization for array 32, or $G_{0pk}H_{32b}+G_{0ck}H_{32a}$. Since $H_{32b}$ is the identity function, acoustic transfer function $G_{1ck(2)}$ can be described:

$G_{1ck(2)}=G_{0pk}+G_{0ck}H_{32a}$, generated by the final optimization of bass array elements 32.

The radiated signal from array 32 to seat position 18 contributed by input signal 410 is affected by system transfer function $G_{3240}$, and so the second acoustic transfer function $G_{1ck(2)}$ is modified by the system transfer function. Accordingly, the overall transfer function $Y_{1k(2)}$ for a point k at the expected head position of occupant 58 is:

$$Y_{1k(2)}=G_{1pk(2)}+G_{3240}G_{1ck(2)}.$$

Because, in the first optimization, there were ten microphone measurement positions k at the expected head positions of occupants 58 and 70, there are ten known transfer functions of each of $G_{0pk(2)}$, $G_{0ck(2)}$, $G_{1pk(2)}$ and $G_{1ck(2)}$. A cost function J is defined similarly to the cost function described above. The gradient of the cost function is calculated in the same manner as discussed above, resulting in a series of gradients for real and imaginary parts at each frequency position within the resolution of the transfer functions (e.g. every 5 Hz). To avoid over-fitting, the same smoothing filter as discussed above can be applied to the gradient values. If it is desired that the secondary cancelling IIR filters $G_{xxxx}$ be causal, the smoothed gradient series can then be transformed to the time domain by an inverse discrete Fourier transform, and the same time domain window applied as discussed above. The result is transformed back to the frequency domain. The complex values of the Fourier transform are changed in the direction of the gradient by the same step size as described above, and these complex values are used to define real and imaginary parts of a transfer function for an FIR filter for filter $H_{32a}$. This process is repeated until the cost function does not change or its change (or the change in isolation) falls within a predetermined threshold. The FIR filter coefficients are then fitted to an IIR, and the filter is stored.

In another embodiment, again assume that only input 410 is active. The overall transfer function between signal 410 and a point k at the expected head position of occupant 58 at seat position 18, through array 40, is:

$G_{1pk(2)}=G_{1pk}+G_{1ck}H_{40a}$, generated by the final optimization of bass array elements 40. The overall transfer function between signal 410 and the same point k at seat position 18, through array 32, is:

$G_{1ck(2)}=G_{0pk}+G_{0ck}H_{32a}$, generated by the final optimization of bass array elements 32.

The radiated signal from array 32 to seat position 18 contributed by input signal 410 is affected by system transfer function $G_{3240}$, and so the second acoustic transfer function $G_{1ck(2)}$ is modified by the system transfer function. Accordingly, the overall transfer function $Y_{1k(2)}$ for a point k at the expected head position of occupant 58 is:

$$Y_{1k(2)}=G_{1pk(2)}+G_{3240}G_{1ck(2)}$$

If it is desired that $G_{1pk(2)}$ and $G_{1ck(2)}$ cancel each other at point k, then $G_{3240}$ may be set to $G_{1pk(2)}$ divided by $G_{1ck(2)}$, shifted 180° out of phase.

In either embodiment, digital signal processor 96-3 defines IIR filter $G_{3240}$ by the coefficients determined by the respective method. Input signal 410 is directed to digital signal processor 96-3, where the input signal is processed by transfer function $G_{3240}$ and added to the input signal 412 that drives bass array 32, at summing junction 414. Accordingly, IIR filter $G_{3240}$ adds to the audio signal driving array 32 an audio signal that is processed to cancel the expected leaked audio from array 40, thereby further tending to isolate the bass audio at array 40 with respect to seat position 18.

A similar transfer function $G_{3256}$ is defined, in the same manner, between array 32 and the signal from seat specific audio signal processing circuitry 94 that drives bass array 56.

A similar transfer function $G_{3250}$ is defined, in the same manner, between array 32 and the signal from seat specific audio signal processing circuitry 92 that drives bass array 50.

As indicated in FIGS. 3I and 3J, a set of three secondary cancellation transfer functions is defined for each of the other three bass arrays. For each bass array, each of the three secondary cancellation transfer functions effects a transfer function between that bass array and the input audio signal to a respective one of the other bass arrays that tends to cancel radiation from the other bass array. It should be understood, however, that in other embodiments, secondary cancellation filters may not be provided among all the bass arrays. For example, secondary cancellation filters may be provided between arrays 32 and 40, and also between arrays 50 and 56, but not between the front and back bass arrays.

Beyond bass frequencies, the magnitude and phase of leaked audio considered at any given seat position, from any other seat position, can be expected not to vary rapidly for variations in the head position of the occupant at that seat position, up to about 400 Hz. Accordingly, in another embodiment, a secondary cancellation filter is defined between the input signals to high frequency arrays at each seat position and an array at each other seat position. More specifically, a secondary cancellation filter is applied between each high frequency array shown in FIG. 2A and an array at each other seat position that is aligned generally between that array and the occupant of the other seat position. For example, referring to FIGS. 2A and 3A, a cancellation filter between arrays 26 and 34 is applied from the signal upstream from circuitry 96-2 to a sum junction in the signal between signal processing circuitry 90 and array circuitry 98-2. That is, the signal applied to array 26, before being processed by the array's signal processing circuitry, is also applied to the input signal to array 34, as modified by the secondary cancellation filter. The table below identifies the secondary cancellation filter relationships among the arrays shown in FIG. 2A. For purposes of clarity, these cancellation filters are not shown in the Figures.

| Secondary cancellation filter is applied from the input signal to array (upstream from the array circuitry of the array): | | Secondary cancellation filter provides cancellation signal to the input signal to array (upstream from the array circuitry of the array): | |
|---|---|---|---|
| Array | Seat Position | Array | Seat Position |
| 26 | 18 | 34 | 20 |
| 26 | 18 | 46 | 22 |
| 26 | 18 | 48 | 24 |
| 27 | 18 | 34 | 20 |
| 27 | 18 | 48 | 22 |
| 27 | 18 | 48 | 24 |
| 28 | 18 | 30 | 20 |
| 28 | 18 | 46 | 22 |
| 28 | 18 | 48 | 24 |
| 30 | 18 | 34 | 20 |
| 30 | 18 | 48 | 22 |
| 30 | 18 | 48 | 24 |
| 34 | 20 | 27 | 18 |

-continued

| Secondary cancellation filter is applied from the input signal to array (upstream from the array circuitry of the array): | | Secondary cancellation filter provides cancellation signal to the input signal to array (upstream from the array circuitry of the array): | |
|---|---|---|---|
| Array | Seat Position | Array | Seat Position |
| 34 | 20 | 48 | 22 |
| 34 | 20 | 48 | 24 |
| 36 | 20 | 27 | 18 |
| 36 | 20 | 48 | 22 |
| 36 | 20 | 54 | 24 |
| 30 | 20 | 27 | 18 |
| 30 | 20 | 48 | 22 |
| 30 | 20 | 48 | 24 |
| 38 | 20 | 30 | 18 |
| 38 | 20 | 48 | 22 |
| 38 | 20 | 54 | 24 |
| 42 | 22 | 26 | 18 |
| 42 | 22 | 34 | 20 |
| 42 | 22 | 44 | 24 |
| 44 | 22 | 27 | 18 |
| 44 | 22 | 34 | 20 |
| 44 | 22 | 48 | 24 |
| 46 | 22 | 26 | 18 |
| 46 | 22 | 34 | 20 |
| 46 | 22 | 48 | 24 |
| 48 | 22 | 27 | 18 |
| 48 | 22 | 34 | 20 |
| 48 | 22 | 44 | 24 |
| 44 | 24 | 27 | 18 |
| 44 | 24 | 34 | 20 |
| 44 | 24 | 48 | 22 |
| 52 | 24 | 27 | 18 |
| 52 | 24 | 36 | 20 |
| 52 | 24 | 44 | 22 |
| 48 | 24 | 27 | 18 |
| 48 | 24 | 34 | 20 |
| 48 | 24 | 44 | 22 |
| 54 | 24 | 27 | 18 |
| 54 | 24 | 36 | 20 |
| 54 | 24 | 48 | 22 |

The secondary cancellation filters between the high frequency arrays are defined in the same manner as are the cancellation filters for the bass arrays, except that each filter has an inherent low pass filter, with a break frequency of about 400 Hz. $W_{iso}$ is set to about 1 kHz Referring to FIGS. 3A and 3D, the audio system may include a plurality of signal sources 76, 78 and 80 coupled to audio signal processing circuitry that is disposed between the audio signal sources and the loudspeaker arrays. One component of this circuitry is audio signal processing circuitry 82, to which the signal sources are coupled. Although three audio signal sources are illustrated in the figures, it should be understood that this is for purposes of explanation only and that any desired number of signal sources may be employed, as indicated in the Figures. In one embodiment, there is at least one independently selectable signal source per seat position, selectable by control circuitry 84. For example, audio signal sources 76-80 may comprise sources of music content, such as channels of a radio receiver or a multiple compact disk (CD) player (or a single channel for the player, which may be selected to apply a desired output to the channel, or respective channels for multiple CD players), or high-density compact disk (DVD) player channels, cell phone lines, or combinations of such sources that are selectable by control circuitry 84 through a manual input 86 (e.g. a mechanical knob or dial or a digital keypad or switch) that is available to driver 58 or individually to any of the occupants for their respective seat positions.

Audio signal processing circuitry 82 is coupled to seat specific audio signal processing circuitry 88, 90, 92 and 94. Seat specific audio signal processing circuitry 88 is coupled to directional loudspeakers 28, 26, 32, 27 and 30 by array circuitry 96-1, 96-2, 96-3, 96-4 and 96-5, respectively. Seat specific audio signal processing circuitry 90 is coupled to directional loudspeakers 30, 34, 40, 36 and 38 by array circuitry 98-1, 98-2, 98-3, 98-4 and 98-5, respectively. Seat specific audio signal processing circuitry 92 is coupled to directional loudspeakers 46, 42, 50, 48 and 44 by array circuitry 100-1, 100-2, 100-3, 100-4 and 100-5, respectively. Seat specific audio signal processing circuitry 94 is coupled to directional loudspeakers 48, 44, 56, 52 and 54 by array circuitry 102-1, 102-2, 102-3, 102-4 and 102-5, respectively. In addition, each seat specific audio signal processing circuit outputs the signal for its respective bass array to bass array circuits of the other three seat positions so that the other bass array circuits can apply the secondary cancellation transfer functions as discussed above. The signals between the signal processing circuitry and the array circuitry for the respective high frequency arrays are also directed over to other array circuitry through secondary cancellation filters, as discussed above, but these connections are omitted from the Figures for purposes of clarity. The array circuitry may be implemented by respective digital signal processors, but in the presently described embodiment, the array circuitry 96-1 to 96-5, 98-1 to 98-5, 100-1 to 100-5 and 102-1 to 102-5 is embodied by a common digital signal processor, which furthermore embodies control circuitry 84. Memory, for example chip memory or separate non-volatile memory, is coupled to the common digital signal processor.

For purposes of clarity, only one communication line is illustrated between each array circuitry block 96-1 to 102-5 and its respective loudspeaker array. It should be understood, however, that each array circuitry block independently drives each speaker element in its array. Thus, each communication line from an array circuitry block to its respective array should be understood to represent a number of communication lines equal to the number of audio elements in the array.

In operation, audio signal processing circuitry 82 presents audio from the audio signal sources 76-80 to directional loudspeakers 26, 27, 28, 30, 32, 34, 36, 38, 40, 42, 44, 46, 48, 50, 52, 54 and 56. The audio signal presented to any one of the four groups of directional loudspeakers (i) 26/28/27/30/32, (ii) 30/34/36/38/40, (iii) 42/44/46/48/50, and (iv) 44/48/52/54/56 may be the same as the audio signal presented to any one or more of the three other directional loudspeaker groups, or the audio signal to each of the four groups may be from a different audio signal source. Seat specific audio signal processor 88 performs operations on the audio signal transmitted to directional loudspeakers 26/27/28/30/32. Seat specific audio signal processor 90 performs operations on the audio signal transmitted to directional loudspeakers 30/34/36/38/40. Seat specific audio signal processor 92 performs operations on the audio signal transmitted to directional loudspeakers 42/44/46/48/50. Seat specific audio signal processor 94 performs operations on the audio signal transmitted to directional loudspeakers 44/48/52/54/56.

Referring to seat position 18, the audio signal to directional loudspeakers 26, 27, 28 and 30 may be monophonic, or may be a left channel (to loudspeaker arrays 26 and 28) and a right channel (to loudspeaker arrays 27 and 30) of a stereophonic signal, or may be a left channel/right channel/center channel/left surround channel/right surround channel of a multi-channel audio signal. The center channel may be provided equally by the left and right channel speakers or may be defined by spatial cues. Similar signal arrangements can be applied to the other three loudspeaker groups. Thus, each of lines 502, 504 and 505 (FIG. 3B) from audio signal sources 76, 78 and 80 can represent multiple separate channels, depending on system capabilities. In response to control information received from the user through manual input 86, control circuit 84 sends a signal to audio signal processing circuit 82 at 508 selecting a given audio signal source 76-80 for one or more of the seat positions 18, 20, 22 and 24. That is, signal 508 identifies which audio signal source is selected for each seat position. Each seat position can select a different audio signal source, or one or more of the seat positions can select a common audio signal source. Given that signal 508 selects one of the audio input lines 502, 504 or 506 for each seat position, audio signal processing circuit 82 directs the five channels on the selected line 502, 504 or 506 to the seat specific audio signal processing circuiting 88, 90, 92 or 94 for the appropriate seat position. The five channels are separately illustrated in FIG. 3B extending from circuitry 82 to processing circuitry 88.

Array circuitry 96-1 to 96-5, 98-1 to 98-5, 100-1 to 100-5, and 102-1 to 102-5 apply the element-specific transfer functions discussed above to the individual array elements. Thus, the array circuitry processor(s) apply a combination of phase shift, polarity inversion, delay, attenuation and other signal processing to cause the high frequency directional loudspeakers (e.g., loudspeaker arrays 26, 27, 28 and 30 with regard to seat position 18) to radiate audio signals to achieve the desired optimized performance, as discussed above.

The directional nature of the loudspeakers as described above results in acoustic energy radiated to each seat position by its respective group of loudspeaker arrays that is significantly higher in amplitude (e.g., within a range of 10 dB to 20 dB) than the acoustic energy from that seat position's loudspeaker arrays that is leaked to the other three seat positions. Accordingly, the difference in amplitude between the audio radiation at each seat position and the radiation from that seat position leaked to the other seat positions is such that each seat occupant can listen to his or her own desired audio source (as controlled by the occupant through control circuit 84 and manual input 86) without recognizable interference from the audio at the other seat positions. This allows the occupants to select and listen to their respective desired audio signal sources without the need for headphones yet without objectionable interference from the other seat positions.

In addition to routing audio signals from the audio signals sources to the directional loudspeakers, audio signal processing circuitry 82 may perform other functions. For example, if there is an equalization pattern associated with one or more of the audio sources, the audio signal processing circuitry may apply the equalization pattern to the audio signal from the associated audio signal source(s).

Referring to FIG. 3B, there is shown a diagram of seat positions 18 and 20, with the seat specific audio signal processing circuitry of seat position 18 shown in more detail. It should be understood that the audio signal processing circuitry at each of the other three seat positions is similar to that shown in FIG. 3B but not shown in the drawings, for purposes of clarity.

Coupled to audio signal processing circuitry 82, as components of seat specific audio signal processing circuitry 88, are seat specific equalization circuitry 104, seat specific dynamic volume control circuitry 106, seat specific volume control circuitry 108, seat specific "other functions" circuitry 110, and seat specific spatial cues processor 112. In FIG. 3B, the single signal lines of FIGS. 3A and 3D between audio signal processing circuitry 82 and seat specific audio processing circuitry 88 are shown as five signal lines, representing the respective channels for each of the five speaker arrays. This communication can be effected through parallel lines or on a serial line on which the five channels are interleaved. In either event, individual operations are kept synchronized among different channels to maintain proper phase relationship. In operation, equalizer 104, dynamic volume control circuitry 106, volume control circuitry 108, seat specific other functions circuitry 110 (which includes other signal processing functions, for example insertion of crosstalk cancellation), and the seat specific spatial cues processor 112 (discussed below) of seat specific audio signal processing circuitry 88 process the audio signal from audio signal processing circuitry 82 separately from audio signal processing circuitry 90, 92, and 94 (FIGS. 3A and 3D). If desired, the equalization patterns applicable globally to all arrays at a given seat position may be different for each seat position, as applied by the respective equalizers 104 at each seat position. For example, if the occupant of one position is listening to a cell phone, the equalization pattern may be appropriate for voice. If the occupant of another seat position is listening to music, the equalization pattern may be appropriate for music. Seat specific equalization may also be desirable due to differences in the array configurations, environments and transfer function filters among the seat positions. In the presently described embodiments, equalization applied by equalization circuiting 104 does not change, and the equalization pattern appropriate for voice or music is applied by audio signal processing circuitry 82, as described above.

Seat specific dynamic volume control circuitry 106 can be responsive to an operating condition of the vehicle (such as speed) and/or can be responsive to sound detecting devices, such as microphones, in the seating areas. Input devices for applying vehicle-specific conditions for dynamic volume control are indicated generally at 114. Techniques for dynamic control of volume are described in U.S. Pat. No. 4,944,018 and U.S. Pat. No. 5,434,922, each of which is incorporated by reference herein. Circuitry may be provided to permit each seat occupant some control over the dynamic volume control at the occupant's seat position.

The arrangement of FIG. 3B permits the occupants of the four seating positions to listen to audio material at different volumes, as each occupant can control, through manual input 86 at each seat position and control circuitry 84, the volume applied to the seat position by volume control 108. The directional radiation pattern of the directional loudspeakers results in significantly more acoustic energy being radiated to the high radiation position than to the low radiation positions. The acoustic energy at each of the seating positions therefore comes primarily from the directional loudspeakers associated with that seating position and not from the directional loudspeakers associated with the other seating positions, even if the directional loudspeakers associated with the other seating positions are radiating at relatively high volumes. The seat specific dynamic volume control circuitry, when used with microphones near the seating positions, permits more precise dynamic control of the volume at each location. If the noise level (including ambient noise and audio leaked from the seat positions) is significantly higher at one seating position, for example seating position 18, than at another seating position, for example seating position 20, the dynamic volume control associated the seating position 18 raises the volume more than the dynamic volume associated with seat position 20.

The seat position equalization permits better local control of the frequency response at each of the listening positions. The measurements from which the equalization patterns are developed can be made at the individual seating positions.

The directional radiation pattern described above can be helpful in reducing the occurrence of frequency response anomalies resulting from early reflections, in that a reduced amount of acoustic energy is radiated toward nearby reflected surfaces such as side windows. The seat specific other functions control circuitry can provide seat specific control of other functions typically associated with vehicle audio systems, for example tonal control, balance and fade. Left/right balance, typically referred to simply as "balance," may be accomplished differently in the system of FIG. 3B than in conventional audio systems, as will be described below.

Left/right balance in conventional audio systems is typically done by varying the relative level of a signal fed to left and right speakers of a stereo pair. However, conventional audio systems do a relatively poor job of controlling the lateral positioning of an acoustic image for a number of reasons, one of which is poor management of crosstalk, that is, radiation from a left speaker reaching the right ear and radiation from a right speaker reaching the left ear, of an occupant. Perceptually, the lateral localization (or stated more broadly, perceived angular displacement in the horizontal plane) is dependent on two factors. One factor is the relative level of acoustic energy at the two ears, sometimes referred to as "interaural level difference" (ILD) or "interaural intensity difference" (IID). Another factor is time and phase difference (interaural time difference, or "ITD," and interaural phase difference, or "IPD") of acoustic energy at the two ears. ITD and IPD are mathematically related in a known way and can be transformed into each other, so that wherever the term "ITD" is used herein, the term "IPD" can also apply through appropriate transformation. The ITD, IPD, ILD, and IID spatial cues result from the interaction, with the head and ears, of sound waves that are radiated responsively to audio signals. A more detailed description of spatial cues is provided in U.S. patent application Ser. No. 10/309,395, the entire disclosure of which is incorporated by reference herein.

The directional loudspeakers, other than the bass arrays, shown in the figures herein are relatively close to the occupant's head. This allows greater independence in directing audio to the listener's respective ears, thereby facilitating the manipulation of spatial cues.

As described above, each array circuit block 96-1 to 96-5, 98-1 to 98-5, 100-1 to 100-5 and 102-1 to 102-5 individually drives each speaker element within each speaker array. Accordingly, there is an independent audio line from each array circuitry block to each individual speaker element. Thus, referring to FIG. 3A, for example, it should be understood that the system includes three communication lines from front left array circuitry 96-1 to the three respective loudspeaker elements of array 28. Similar arrangements exist for arrays 26, 27, 32, 34, 36, 38, 40, 42, 46, 50, 52, 54 and 56. As indicated above, however, each of arrays 30, 44 and 48 simultaneously serve two adjacent seat positions. FIG. 3C illustrates an arrangement for driving the loudspeaker elements of array 30 by front seats center left array circuitry 96-5 and front seats center right array circuitry 98-1. Because speaker elements 30*a*, 30*b*, 30*c* and 30*d* each serve both seat positions 18 and 20, each of these speaker elements is driven both by the left array circuitry and the right array circuitry through signal combiners 116, 117, 118 and 119.

Similar arrangements are provided for arrays 44 and 48. Regarding array 48, signals from rear seats front center left array circuitry 100-4 (FIG. 3D) and rear seats front center right array circuitry 102-2 (3D) are combined by respective summing junctions and directed to loudspeaker elements 48a-48e (FIG. 2B). Regarding array 44, respective signals from rear seats rear center left array circuitry 100-5 and from rear seats rear center right array circuitry 102-4 are combined by respective combiners for loudspeakers elements 44a-44d.

The transfer functions at the individual array circuitry blocks 96-2, 96-4, 98-2, 98-4, 100-2, 100-5, 102-1 and 102-4 for the secondary array elements of arrays 26, 27, 28, 30, 34, 36, 38, 42, 44, 46, 48 and 52 may low pass filter the signals to the directional loudspeakers with a cutoff frequency of about 4 kHz. The transfer function filters for the bass speaker arrays are characterized by a low pass filter with a cuttoff frequency of about 180 Hz.

In a still further embodiment, a system as disclosed in the Figures may operate as an in-vehicle conferencing system. Referring to FIG. 2A, respective microphones 602, 604, 606 and 608 may be provided respectively at seat positions 18, 20, 22 and 24. It should be understood that the microphones, shown schematically in FIG. 2A, may be disposed at their respective seat positions at any suitable position as available. For example, with respect to seat positions 22 and 24, microphones 606 and 608 may be placed in the back of the seats at seat positions 18 and 20. Microphones 602 and 604 may be disposed in the front dash or rearview mirror. In general, the microphones may be disposed in the vehicle headliner, the side pillars or in one of the loudspeaker array housings at their seat positions.

While it should be understood that any suitable microphone may be used, microphones 602, 604, 606 and 608 in the presently described embodiment are pressure gradient microphones, which improve the ability to detect sounds from specific seats while rejecting other sounds in the vehicle. In some embodiments, pressure gradient microphones may be oriented so that nulls in their directivity patterns are directed to one or more locations nearby where loudspeakers are present in the vehicle that may be used to reproduce signals transduced by the microphone. In another embodiment, one or more directional microphone arrays are disposed generally centrally with respect to two or more seat positions. The outputs of the microphones in the array are selectively combined so that sound impinging on the array from certain desired directions is emphasized. Since the desired directions are known and fixed, in some embodiments the array can be designed with fixed combinations of microphone outputs to emphasize desired location. In other embodiments, the directional array pattern may vary dramatically, where null patterns are steered toward interfering sources in the vehicle, while still concentrating on picking up information from desired locations.

Referring also to FIG. 3A, each microphone 602, 604, 606 and 608 is an audio signal source 76-80 having a discrete input line into audio signal processing circuitry 82. Thus, audio signal processing circuitry 82 can identify the particular microphone, and therefore the particular seat position, from which the speech signals originate. Audio signal processing circuitry 82 is programmed to direct output signals corresponding to input signals received from each microphone to the seat specific audio signal processing circuitry 88, 90, 92 or 94 for each seat position other than the seat position from which the speech signals were received. Thus, when audio signal processing circuitry 82 receives speech signals from microphone 602, the signal processing circuitry outputs corresponding audio signals to seat specific audio signal processing circuitry 90, 92 and 94 corresponding to seat positions 20, 22 and 24, respectively. When signal processing circuitry 82 receives speech signals from microphone 604, the processing circuitry outputs corresponding audio signals to seat specific audio signal processing circuitry 88, 92 and 94 corresponding to seat positions 18, 22 and 24, respectively. When audio signal processing circuitry 82 receives speech signals from microphone 606, the signal processing circuitry outputs corresponding audio signals to seat specific audio signal processing circuitry 88, 90 and 94 corresponding to seat positions 18, 20 and 24, respectively. When audio signal processing circuitry 82 receives speech signals from microphone 608, the processing circuitry outputs corresponding audio signals to seat specific audio signal processing circuitry 88, 90 and 92 corresponding to seat positions 18, 20 and 22, respectively.

In a further embodiment, a vehicle occupant (e.g. the driver or any of the passengers) can select (e.g. through input 86 to control circuit 84) which of the other seat positions to which speech from that occupant's seat position is to be directed. Thus, for example, while the default setting is that speech from microphone 602 is routed to signal processing circuitry 90, 92 and 94, driver 58 can limit the in-vehicle conference to seat position 20 by an appropriate instruction through input 82, in which case the speech is routed only to signal processing circuitry 90. Since all passengers may have this ability, it is possible to simultaneously conduct different conferences among different groups of passengers in the same vehicle.

In the presently described embodiment, the transfer function filters that process signals to the loudspeaker arrays for each of the four seat positions are optimized with respect to the other seat positions based upon whether the other seat positions are occupied, without regard to commonality of audio sources. That is, seat occupancy, but not audio source commonality, is the criteria for determining whether a given seat position is isolated with respect to other seat positions. Thus, when speech audio signal processing circuitry 82 receives speech signals from a microphone at a given seat position and outputs corresponding audio signals to each other occupied seat position, the seat position from which the speech signals were received is acoustically isolated from each of those occupied seat positions. For instance, if seat occupant 58 speaks, such that the speech is detected by microphone 602, audio signal processing circuitry 82 outputs corresponding audio signals to the circuitry that drives seat positions 20, 22 and 24 (in one embodiment, only if seat positions 20, 22 and 24 are occupied). Because seat position 18 is occupied, however, the speaker array at each of seat positions 20, 22 and 24 are isolated with respect to seat position 18. Therefore, and because processing circuitry 82 does not direct the output speech signals to the loudspeaker arrays at seat position 18, the likelihood is reduced that loudspeaker radiation resulting from the signals originating at microphone 602 will reach microphone 602 at a sufficiently high level to cause undesirable feedback. In another embodiment, all seat positions are isolated with respect to all other seat positions in a vehicle conferencing mode, which may be selected through input 86 and control circuit 84, regardless of seat occupancy.

Because of the reduction in feedback loop gain achieved by the isolation configurations described herein, the conferencing system may more effectively employ simplified feedback reduction techniques, such as frequency shifting and programmable notch filters. Other techniques, such as echo cancellation, may also be used.

In a still further embodiment, audio signal processing circuitry 82 does output audio signals corresponding to microphone input from a given seat position to the loudspeaker arrays of the same seat position, but at a significant attenuation. The attenuated playback, as in telephony side tone techniques, may confirm to the speaker that his speech is being heard, so that the speaker does not undesirably increase the volume of his speech, but the attenuation of the playback signal still reduces the likelihood of undesirable feedback at the seat position microphone.

Audio signal processing circuitry 82 outputs speech audio to the various seat positions regardless whether other audio signal sources simultaneously provide audio signals to those seat positions. That is, conversations may occur through the in-vehicle conferencing system in conjunction with operation of other audio signal sources, although when in vehicle conferencing mode (whether activated by the user through input 82 or automatically by activation of a microphone), the system can automatically reduce volume of the other audio sources.

In yet another embodiment, audio signal processing circuitry 82 selectively drives one or more speaker arrays at each listening position to provide a directional cue related to the microphone audio. That is, the audio signal processing circuitry applies the speech output signal to one or more loudspeaker arrays at each receiving listening position that are oriented with respect to the occupant of that seat position generally in alignment with the occupant of the seat position from which the speech signals originate.

For instance, assume speech signals originate from occupant 58 of seat position 18, through microphone 602. With regard to seat position 20, audio signal processing circuitry 82 provides corresponding audio signals only to array circuitry 98-1 and 98-2. Thus, occupant 70 receives the resulting speech audio from the general direction of the speaker, occupant 58. Referring also to FIG. 3D, audio signal processing circuitry 82 also outputs the corresponding speech audio signals to array circuitry 100-1, for array 46 of seat position 22, and array circuitry 100-2 for array 48 of seat position 24, to thereby provide an appropriate acoustic image at each of those seat positions.

With regard with speech signals originating from occupant 70 of seat position 20, audio signal processing circuitry 82 provides corresponding signals to array circuitry 96-4 and 96-5, for arrays 27 and 30 of seat position 18, to array circuitry 100-4, for array 48 of seat position 22, and to array circuitry 102-5, for array 54 of seat position 24.

With regard to speech signals originating from occupant 72 of seat position 22 through microphone 606, audio signal processing circuitry 82 provides corresponding audio output signals to array circuitry 96-2, for array 26 of seat position 18, to array circuitry 98-2, for array 34 of seat position 20, and to array circuitry 102-1 and 102-2, for arrays 44 and 48 of seat position 24.

With regard to speech signals received from occupant 74 of seat position 24 through microphone 608, audio signal processing circuitry 82 provides corresponding output audio signals to array circuitry 96-4, for array 27 at seat position 18, to array circuitry 98-4, for array 36 at seat position 20, and to array circuitry 100-4 and 100-5, for arrays 48 and 44 at seat position 22.

Alternatively, or additionally, similar acoustic images may be defined by the application of spatial cues through spatial cues DSP 112. The definition of spatial cues to provide acoustic images should be well understood in the art and is, therefore, not discussed further herein.

While one or more embodiments of the present invention have been described above, it should be understood that any and all equivalent realizations of the present invention are included within the scope and spirit thereof. Thus, the embodiments presented herein are by way of example only and are not intended as limitations of the present invention. Therefore, it is contemplated that any and all such embodiments are included in the present invention as may fall within the scope of the appended claims.

What is claimed is:

1. An audio system for a vehicle having seat positions, said audio system comprising:

a respective loudspeaker array mounted at each of a plurality of seat positions in the vehicle;

a microphone mounted in the vehicle with respect to a first seat position of the plurality of seat positions so that the microphone detects speech from an occupant of the first seat position and outputs signals corresponding to the detected speech; and processing circuitry between the microphone and each said respective loudspeaker array, wherein, for the first seat position, the processing circuitry receives the signals corresponding to the detected speech from the occupant of the first seat position and drives a respective loudspeaker array at each of one or more seat positions of the plurality of seat positions other than the first seat position to directionally radiate first acoustic energy corresponding to the detected speech to said one or more other seat position and to directionally radiate second acoustic energy to the first seat position so that the second acoustic energy is less than the first acoustic energy according to a predetermined criteria, wherein each seat position of the plurality of seat positions is a said first seat position with respect to one or more seat positions other than that first seat position and the system has a plurality of said respective loudspeaker arrays mounted at each seat position of the plurality of seat positions, and wherein, at each said other seat position of the plurality of seat positions with respect to a respective said first seat position, the processing circuitry drives any said respective loudspeaker array with signals that correspond to the detected speech from the occupant of the respective first seat position only if the respective loudspeaker array is aligned between said other seat position and the respective first seat position.

2. A method of providing an audio system in a vehicle having a plurality of seat positions at which are disposed respective loudspeaker arrays configured to radiate acoustic energy to the seat positions at which the respective loudspeaker arrays are disposed and to isolate the other said seat positions of the plurality of seat positions from the acoustic energy, comprising the step of:

providing at least one microphone within the vehicle constructed and arranged to detect speech from an occupant of a first said seat position and output signals corresponding to the detected speech to the respective loudspeaker arrays at each of one or more said seat positions other than the first seat position, and excluding the first seat position, so that acoustic energy radiated by the respective loudspeaker array at said each other seat position corresponds to the detected speech;

providing a respective filter between the microphone and said respective loudspeaker array at said each other seat position, wherein the respective filter processes audio signals from the microphone to its respective loudspeaker array;

defining a respective cost function that compares acoustic energy in the vehicle radiated from said respective loudspeaker array at said each other seat position to the first seat position to acoustic energy in the vehicle radiated from the respective loudspeaker array at the other seat position to the other seat position;

calculating each said respective cost function; and iteratively modifying each respective filter in response to its calculated cost function toward a predetermined criteria so that the acoustic energy radiated to the first seat position from the loudspeaker array at the other seat position corresponding to the respective filter is below a level that causes audio feedback at the first seat position.

3. The method as in claim 2, wherein each seat position of the plurality of seat positions is a said first seat position with respect to one or more seat positions other than that first seat position and wherein the audio system comprises a plurality of the at least one microphones constructed and arranged to respectively detect speech from an occupant of each seat position.

4. The method as in claim 2, wherein each respective filter provides unity gain at the second providing step.

5. A method of operating an audio system in a vehicle having a plurality of seat positions at which are disposed respective loudspeaker arrays configured to radiate acoustic energy to the seat positions at which the respective loudspeaker arrays are disposed and to isolate the other said seat positions of the plurality of seat positions from the acoustic energy, comprising the step of:

providing at least one microphone within the vehicle constructed and arranged to detect speech from an occupant of a first said seat position and output signals corresponding to the detected speech to the respective loudspeaker arrays at each of one or more said seat positions other than the first seat position, and excluding the first seat position, so that acoustic energy radiated by the respective loudspeaker array at said each other seat position corresponds to the detected speech; and driving said respective loudspeaker array at said each of one or more other seat positions to directionally radiate first acoustic energy corresponding to the detected speech to said one or more other seat positions and to directionally radiate second acoustic energy to the first seat position that is optimized based on descent of a gradient of a cost function that compares the first acoustic energy to the second acoustic energy so that the second acoustic energy is below a level that causes audio feedback, wherein the audio system comprises a filter between the at least one microphone and at least one speaker element in a said respective loudspeaker array at a said other seat position, wherein the filter processes the signals from the at least one microphone to the at least one speaker element of the respective loudspeaker array so that the filter contributes to a transfer function that relates the signals to the acoustic energy radiated to one or more of the plurality of seat positions from the at least one speaker element, and implementing a set of coefficients to process the signals to the at least one speaker element so that a ratio of said transfer function between the signals and the acoustic energy radiated from the at least one speaker element to the first seat position and said transfer function between the signals and the acoustic energy radiated from the at least one speaker element to the other seat position meets a predetermined criteria for acoustic isolation.

6. An audio system for a vehicle having seat positions, said audio system comprising:

at least one source of audio signals;

a respective loudspeaker array mounted at each seat position of a plurality of the seat positions and coupled to the at least one source so that the audio signals drive the respective loudspeaker arrays to radiate acoustic energy;

wherein the at least one source comprises at least one microphone mounted in the vehicle with respect to a first seat position of the plurality of seat positions so that the at least one microphone detects speech from an occupant of the first seat position and outputs signals corresponding to the detected speech;

a filter between the at least one source and the respective loudspeaker array mounted at the first seat position that processes the audio signals that drive the respective loudspeaker array at the first seat position and is optimized based on descent of a gradient of a cost function that compares a magnitude of first acoustic energy radiated from the respective loudspeaker array at the first seat position to each other seat position of the plurality of seat positions to a magnitude of second acoustic energy radiated from the respective loudspeaker array at the first seat position to the first seat position so that the filter reduces the magnitude of the first acoustic energy compared to the magnitude of the second acoustic energy; and processing circuitry between the at least one source and the respective loudspeaker arrays, wherein the processing circuitry receives the signals corresponding to the detected speech and outputs signals corresponding to the detected speech from the occupant of the first seat position to drive the respective loudspeaker array for each said other seat position and attenuates signals corresponding to the detected speech from the occupant of the first seat position that drive the respective loudspeaker array at the first seat position, wherein each seat position of the plurality of seat positions is a said first seat position with respect to each seat position other than that first seat position and the system comprises a plurality of said respective loudspeaker arrays mounted at each first seat position, and wherein, at each second seat position of the plurality of seat positions, the processing circuitry drives any said respective loudspeaker array with signals that correspond to the detected speech from the occupant of a first seat position only if the respective loudspeaker array is aligned between the second seat position and the first seat position.

7. A method of operating an audio system in a vehicle having seat positions, comprising the steps of:

driving respective loudspeaker arrays mounted at a plurality of the seat positions so that the respective loudspeaker arrays radiate acoustic energy;

providing a plurality of microphones respectively mounted in the vehicle at the plurality of seat positions so that each microphone detects speech from an occupant of the seat position at which it is mounted and outputs signals corresponding to the detected speech; and in response to a said microphone detecting speech at its seat position, driving a respective loudspeaker array at each other seat position of the plurality of seat positions to radiate acoustic energy corresponding to the detected speech, comprising processing signals that drive the respective loudspeaker arrays at the other seat positions and that correspond to the detected speech so that each respective loudspeaker array at each said other seat position directionally radiates first acoustic energy to its seat position and directionally radiates second acoustic energy to the microphone's seat position and so that the second acoustic energy is less than the first acoustic energy according to a predetermined criteria, wherein, where a plurality of said respective loudspeaker arrays are mounted at each said seat position, the second driving step comprises driving, at each said other seat position, a said respective loudspeaker array with signals that correspond to the detected speech from the occupant of the microphone's seat position only if the respective loudspeaker array is aligned between the other seat position and the microphone's seat position.

8. A method of operating an audio system in a vehicle having seat positions, comprising the steps of:

driving respective loudspeaker arrays mounted at a plurality of the seat positions so that the respective loudspeaker arrays radiate acoustic energy; wherein at least one microphone is mounted in the vehicle with respect to a first seat position of the plurality of seat positions so that the at least one microphone detects speech from an occupant of the first said seat position and outputs signals corresponding to the detected speech;

driving the respective loudspeaker array at the first seat position to reduce a magnitude of acoustic energy radiated from the respective loudspeaker array at the first seat position to each seat position of the plurality of seat positions other than the first seat position, compared to a magnitude of acoustic energy radiated from the respective loudspeaker array at the first seat position to the first seat position; and driving the respective loudspeaker array for each said other seat position with signals corresponding to the detected speech from the occupant of the first seat position and attenuating signals corresponding to the detected speech from the occupant of the first seat position that drive the respective loudspeaker array at the first seat position, wherein each seat position of the plurality of seat positions is a said first seat position with respect to one or more seat positions other than that first seat position and wherein, where a plurality of said respective loudspeaker arrays are mounted at each seat position of the plurality of seat positions, the step of driving the respective loudspeaker array for each said other seat position comprises driving, at each said other seat position of the plurality of seat positions with respect to a respective said first seat position, any said respective loudspeaker array with signals that correspond to the detected speech from the occupant of the respective first seat position only if the respective loudspeaker array is aligned between said other seat position and the respective first seat position.

9. An audio system for a vehicle having seat positions, where the audio system is capable of outputting different audio content supplied by a plurality of audio sources to occupants of said seat positions simultaneously, the audio system constructed and arranged to provide acoustic isolation between different seat positions, said audio system comprising:

a respective at least one loudspeaker mounted at each seat position of a plurality of the seat positions;

respective microphones located at the plurality of seat positions so that each microphone detects speech from an occupant of its said seat position and outputs signals corresponding to the detected speech;

processing circuitry between the microphones and the respective loudspeakers that, in response to signals received from any said microphone corresponding to speech detected by the microphone at a first said seat position, either drives the at least one loudspeaker at one or more said seat positions other than the first seat position, but not the at least one loudspeaker at the first seat position, with signals corresponding to the detected speech, or drives the at least one loudspeaker at the one or more other said seat positions with signals corresponding to the detected speech and drives the at least one loudspeaker at the first seat position with signals corresponding to the detected speech that are attenuated with respect to the signals that drive the at least one loudspeaker at the one or more other seat positions;

wherein the respective loudspeaker mounted at each seat position of the plurality of seat positions is coupled to at least one of the audio sources so that audio signals from the at least one audio source drives the respective at least one loudspeaker to radiate acoustic energy; and a filter between the at least one source and the respective at least one loudspeaker at the first seat position, wherein the filter processes the audio signals from the at least one source to at least one speaker element of the respective at least one loudspeaker at the first seat position so that the filter contributes to a transfer function that relates the audio signals from the at least one source to the acoustic energy radiated to one or more of the plurality of seat positions, wherein the filter implements a set of coefficients to process the audio signals from the at least one source to the at least one speaker element so that a ratio of said transfer function between the audio signals from the at least one source to the at least one speaker element and the acoustic energy radiated by the at least one speaker element to at least one seat position of the plurality of seat positions other than the first seat position and said transfer function between the audio signals from the at least one source to the at least one speaker element and the acoustic energy radiated by the at least one speaker element to the first seat position meets a predetermined criteria for acoustic isolation so that the acoustic energy radiated by the at least one loudspeaker at the at least one other seat position to the first seat position is below a level that causes audio feedback, and wherein the ratio is a ratio of said transfer function between the audio signals from the at least one source to the at least one speaker element and the acoustic energy radiated by the at least one speaker element to each said seat position of the plurality of seat positions other than the first seat position and said transfer function between the audio signals from the at least one source to the at least one speaker element and the output acoustic energy radiated by the at least one speaker element to the first seat position.

* * * * *